US008670908B2

(12) United States Patent
Shimizu et al.

(10) Patent No.: US 8,670,908 B2
(45) Date of Patent: Mar. 11, 2014

(54) AUTOMATIC TRANSMISSION

(75) Inventors: Tetsuya Shimizu, Anjo (JP); Kenichi Tsuchida, Hazugun (JP); Akitomo Suzuki, Anjo (JP); Kazunori Ishikawa, Toyota (JP); Masamichi Yamaguchi, Anjo (JP)

(73) Assignee: Aisin AW Co., Ltd., Aichi-ken (JP)

( * ) Notice: Subject to any disclaimer, the term of this patent is extended or adjusted under 35 U.S.C. 154(b) by 324 days.

(21) Appl. No.: 12/992,223

(22) PCT Filed: Sep. 30, 2009

(86) PCT No.: PCT/JP2009/005062
§ 371 (c)(1),
(2), (4) Date: Nov. 11, 2010

(87) PCT Pub. No.: WO2010/038458
PCT Pub. Date: Apr. 8, 2010

(65) Prior Publication Data
US 2011/0066339 A1 Mar. 17, 2011

(30) Foreign Application Priority Data
Sep. 30, 2008 (JP) ................................. 2008-255852

(51) Int. Cl.
G06F 7/00 (2006.01)
(52) U.S. Cl.
USPC .................... 701/58; 701/51; 701/67; 477/57; 477/97
(58) Field of Classification Search
USPC .......... 701/22, 51, 58, 62, 65, 67; 477/15, 57, 477/97, 131; 180/65.285, 65.6
See application file for complete search history.

(56) References Cited

U.S. PATENT DOCUMENTS

| 2004/0029678 A1* | 2/2004 | Kayukawa et al. ............. 477/15 |
| 2007/0021261 A1* | 1/2007 | Morise et al. ................. 475/119 |
| 2008/0113845 A1 | 5/2008 | Kamada et al. |
| 2008/0207383 A1 | 8/2008 | Kato et al. |

FOREIGN PATENT DOCUMENTS

| EP | 0725238 A2 | 8/1996 |
| EP | 1031770 A2 | 8/2000 |
| EP | 1903261 A2 | 3/2008 |
| EP | 1939502 A2 | 7/2008 |
| JP | 3-117767 A | 5/1991 |
| JP | 2006-183705 A | 7/2006 |
| JP | 2008-051254 A | 3/2008 |
| JP | 2008-121843 A | 5/2008 |

OTHER PUBLICATIONS

Partial English translation of Korean Office Action for corresponding KR Patent Application No. 10-2010-7023299 issued on Jun. 7, 2012.

* cited by examiner

Primary Examiner — Gertrude Arthur Jeanglaude
(74) Attorney, Agent, or Firm — Sughrue Mion, PLLC

(57) ABSTRACT

An automatic transmission including an input shaft connected to a drive source; an output shaft connected to a driving wheel; a one-way clutch; friction engagement elements which establish speeds by changing a transmission path between the input shaft and the output shaft based on the application state of the friction engagement elements and application of the one-way clutch, one of the friction engagement elements being a brake that is applied when coasting in a take-off speed. The automatic transmission also includes a controller that determines whether it is possible to initially establish the take-off speed using the one-way clutch based on a predetermined condition, and, if not possible, then the controller establishes the take-off speed by applying the brake.

9 Claims, 8 Drawing Sheets

Fig. 3

|  | C-1 | C-2 | C-3 | B-1 | B-2 | F-1 |
|---|---|---|---|---|---|---|
| P |  |  |  |  |  |  |
| REV |  |  | O |  | O |  |
| N |  |  |  |  |  |  |
| 1ST | O |  |  |  | (O) | O |
| 2ND | O |  |  | O |  |  |
| 3RD | O |  | O |  |  |  |
| 4TH | O | O |  |  |  |  |
| 5TH |  | O | O |  |  |  |
| 6TH |  | O |  | O |  |  |

※ (O) : INDICATES ENGINE BRAKE APPLIED AND EXTREMELY LOW TEMPERATURE

AUTOMATIC TRANSMISSION

CROSS REFERENCE TO RELATED APPLICATIONS

This application is a National Stage of International Application No. PCT/JP2009/005062, filed on Sep. 30, 2009, which claims priority from Japanese Patent Application No. 2008-255852, filed on Sep. 30, 2008, the contents of all of which are incorporated herein by reference in their entirety.

TECHNICAL FIELD

The present invention relates to an automatic transmission mounted in a vehicle or the like. More particularly, the present invention relates to an automatic transmission that enables a smooth take-off.

BACKGROUND ART

A related automatic transmission has been proposed in which a one-way clutch and a second brake are arranged in parallel. During take-off, forward first speed is established by applying a first clutch, and automatically applying the one-way clutch according to the rotation speed of a third carrier. When coasting (i.e., when the engine brake is applied), the second brake, which is arranged parallel to the one-way clutch, is applied instead of the one-way clutch (see PTL 1).
[Citation List]
[Patent Literature]
[PTL 1]
Japanese Patent Application Publication No. 2008-121843

In an automatic transmission such as that described in the PTL 1, forward first speed is established by applying the first clutch and the one-way clutch, so the one-way clutch automatically applies when the braked third carrier tries to rotate in one direction.

However, when the torque applied to the one-way clutch suddenly increases, such as during take-off, particularly during a sudden take-off, when the one-way clutch is apt to slip for some reason, such as when the temperature is extremely low so the viscosity of the oil is high and the oil film between the roller and the race of the one-way clutch is difficult to cut through, that torque may overpower the one-way clutch, such that the one-way clutch starts to slip and the third carrier is no longer able to be braked.

In a normal inexpensive one-way clutch, a simple cylindrical roller is inserted between an outer race and an inner race to stop relative rotation between the outer race and the inner race. Thus, One way to prevent the one-way clutch from slipping is to increase the surface pressure and make it easier to cut through the oil film by using a roller having a shape that applies a large amount of frictional force between it and the inner race, such as a reverse crowning roller (an hourglass-shaped roller) that becomes increasingly larger toward both ends.

However, preventing slipping by improving the structure of the one-way clutch in this way makes it difficult to reduce costs because the one-way clutch itself is expensive, as well as makes it difficult to reduce the size because this one-way clutch is large.

SUMMARY OF INVENTION

Therefore, the present invention aims to provide an automatic transmission that is capable of reliably establishing a shift speed at take-off under any circumstances, while using an inexpensive one-way clutch.

A first aspect of the present invention relates to an automatic transmission which includes a plurality of friction engagement elements, an input shaft that is connected to a drive source, an output shaft that is connected to a driving wheel, a one-way clutch that establishes a take-off speed. The plurality of friction engagement elements establish a plurality of speeds by changing a transmission path between the input shaft and the output shaft based on the application state of the plurality of friction engagement elements and application of the one-way clutch. One of the plurality of friction engagement elements is a brake that is applied when coasting in a take-off speed. The automatic transmission of this first aspect also has a controller which determines whether it is possible to initially establish the take-off speed using the one-way clutch based on a predetermined condition, and, if it is determined that it is not possible to initially establish the take-off speed using the one-way clutch, establishes the take-off speed by applying the brake.

Accordingly, when it is determined that the one-way clutch may slip, the take-off speed is established by applying the brake, which is applied when coasting, instead of the one-way clutch during initial application when the transfer torque applied to the one-way clutch starts to increase with the increase in the engine torque. As a result, the torque load on the one-way clutch can be reduced during initial application which is when the one-way clutch tends to slip, such that the take-off speed is able to be reliably established. Accordingly, a stable take-off is always able to be achieved. Also, even if an inexpensive one-way clutch is used, the one-way clutch will not slip so costs can be reduced while the structure of the automatic transmission can be made compact.

In the aspect described above, after the take-off speed has been established by applying the brake, the controller may execute changeover control that gradually reduces the hydraulic pressure of a hydraulic servo of the brake. Also, the controller may execute quick drain control to reduce the hydraulic pressure faster than the changeover control when gradually reducing the hydraulic pressure of the hydraulic servo of the brake.

The crossover control is executed, and the transfer torque applied to the one-way clutch gradually increases so that the one-way clutch can be reliably applied. Also, executing the quick drain control to reduce the hydraulic pressure faster than the changeover control enables the hydraulic pressure of the hydraulic servo of the brake to be quickly discharged, making it possible to prepare early on for the next shift.

Also, in the first aspect, the controller may determine whether to switch from the changeover control to the quick drain control based on a shift condition which is set farther toward the low load side, by a predetermined amount, than a shift condition which is used to determine a shift from the take-off speed to the next speed based on an accelerator operation amount and vehicle speed.

Accordingly, switching from the changeover control to the quick drain control based on a shift condition which is set farther toward the low load side, by a predetermined amount, than a shift condition from the take-off speed to the next speed, enables the one-way clutch to be reliably applied without rapidly increasing the transfer torque applied to the one-way clutch, and enables the brake to be reliably released before shifting to the next speed. As a result, the take-off speed is able to be established by applying the one-way clutch and the friction engagement element, and the shift into the next speed can be performed simply by re-applying the apply-side friction engagement element.

In the first aspect, the controller may determine whether it is possible to initially establish the take-off speed using the one-way clutch, by determining whether the temperature of the hydraulic fluid of the automatic transmission is lower than a predetermined temperature, as the predetermined condition. Incidentally, the predetermined temperature may be set to a temperature at which the one-way clutch may slip.

As a result, when the temperature of the hydraulic fluid of the automatic transmission is lower than the temperature at which the one-way clutch may slip due to a high viscosity of the fluid, the take-off speed is initially established by applying the brake instead of the one-way clutch. Therefore, the take-off speed can be reliably established even in extremely low temperatures.

A second aspect of the present invention relates to an automatic transmission hydraulic control apparatus which includes a plurality of friction engagement elements, and a plurality of apply pressure control solenoid valves, the number of which is at least one less than the number of the plurality of friction engagement elements, the plurality of apply pressure control solenoid valves being able to supply hydraulic pressure to hydraulic servos of the friction engagement elements. The hydraulic control apparatus establishes a plurality of speeds by changing a transmission path between an input shaft and an output shaft based on the application state of the plurality of friction engagement elements. The hydraulic control apparatus of this second aspect also includes a distribution switching valve which is switched between a first position whereby hydraulic pressure from one of the apply pressure control solenoid valves is supplied to a hydraulic servo of a first friction engagement element, and a second position whereby hydraulic pressure from one of the apply pressure control solenoid valves is supplied to a hydraulic servo of a second friction engagement element; and a first signal solenoid valve which is able to output a signal pressure that switches the distribution switching valve between the first position and the second position. The distribution switching valve has a drain port through which hydraulic pressure of the hydraulic servo of the first friction engagement element is discharged when the distribution switching valve is switched from the first position to the second position.

According to this second aspect, a distribution switching valve is provided with is switched between a first position whereby hydraulic pressure from the apply pressure control solenoid valve is supplied to a hydraulic servo of a first friction engagement element, and a second position whereby hydraulic pressure from the apply pressure control solenoid valve is supplied to a hydraulic servo of a second friction engagement element. Discharging the hydraulic pressure via the drain port of the distribution switching valve through which hydraulic pressure of the hydraulic servo of the first friction engagement element is discharged when the distribution switching valve is switched from the first position to the second position enables the hydraulic pressure of the hydraulic servo to be discharged faster than when the drain port of the apply pressure control solenoid valve is used, without having to provide a special new valve.

Also, in the second aspect, the automatic transmission hydraulic control apparatus may also include a forward-reverse switching valve which is interposed between the hydraulic servo of the first friction engagement element and the distribution switching valve, and which has a first input port to which forward hydraulic pressure from the apply pressure control solenoid valve is able to be supplied when in a forward running range (such as the D-range), a second input port to which reverse hydraulic pressure from a manual valve is supplied when in a reverse running range (such as the R-range), and an output port from which the forward hydraulic pressure or the reverse hydraulic pressure is supplied to the hydraulic servo of the first friction engagement element, the forward-reverse switching valve being switched between a third position whereby the forward hydraulic pressure is able to be supplied to the hydraulic servo of the first friction engagement element, and a fourth position whereby the reverse hydraulic pressure is able to be supplied to the hydraulic servo of the first friction engagement element; and a second signal solenoid valve that is able to output a signal pressure which switches the forward-reverse switching valve between the third position and the fourth position. The forward-reverse switching valve may be structured such that hydraulic pressure of the hydraulic servo of the first friction engagement element is discharged from the drain port of the manual valve when the forward-reverse switching valve is switched from the third position to the fourth position when in the forward running range.

Accordingly, arranging the forward-reverse switching valve between the hydraulic servo of the first friction engagement element and the distribution switching valve, and switching the forward-reverse switching valve from the third position, whereby the forward hydraulic pressure is able to be supplied to the hydraulic servo of the first friction engagement element, to the fourth position, whereby the reverse hydraulic pressure is able to be supplied to the hydraulic servo of the first friction engagement element, when in the forward running range enables the hydraulic pressure of the hydraulic servo of the first friction engagement element to be discharged from the drain port of the manual valve faster than it can be via the apply pressure control solenoid valve.

BRIEF DESCRIPTION OF DRAWINGS

The features, advantages, and technical and industrial significance of the present invention will be described in the following detailed description of example embodiments of the present invention with reference to the accompanying drawings, in which like numerals denote like elements, and wherein:

FIG. 1 is a block diagram of an automatic transmission control apparatus according to the present invention;

FIG. 2 is a skeleton view of an automatic transmission according to the present invention;

[FIG. 3]

FIG. 3 is a clutch and brake application chart of this automatic transmission;

FIG. 4 is a velocity diagram of this automatic transmission;

FIG. 5 is a circuit diagram of a hydraulic control apparatus of the automatic transmission according to the present invention;

FIG. 6 is a flowchart illustrating take-off control at an extremely low temperature according to the present invention;

FIG. 7A is a time graph showing the change during a take-off normally, and FIG. 7B is a time graph showing the change during a take-off at an extremely low temperature; and

FIG. 8 is a shift map showing a condition for switching from changeover control to quick drain control.

DESCRIPTION OF EMBODIMENTS

Hereinafter, example embodiments of the present invention will be described with reference to FIGS. 1 to 8.

General Structure of the Automatic Transmission

Figure 2:
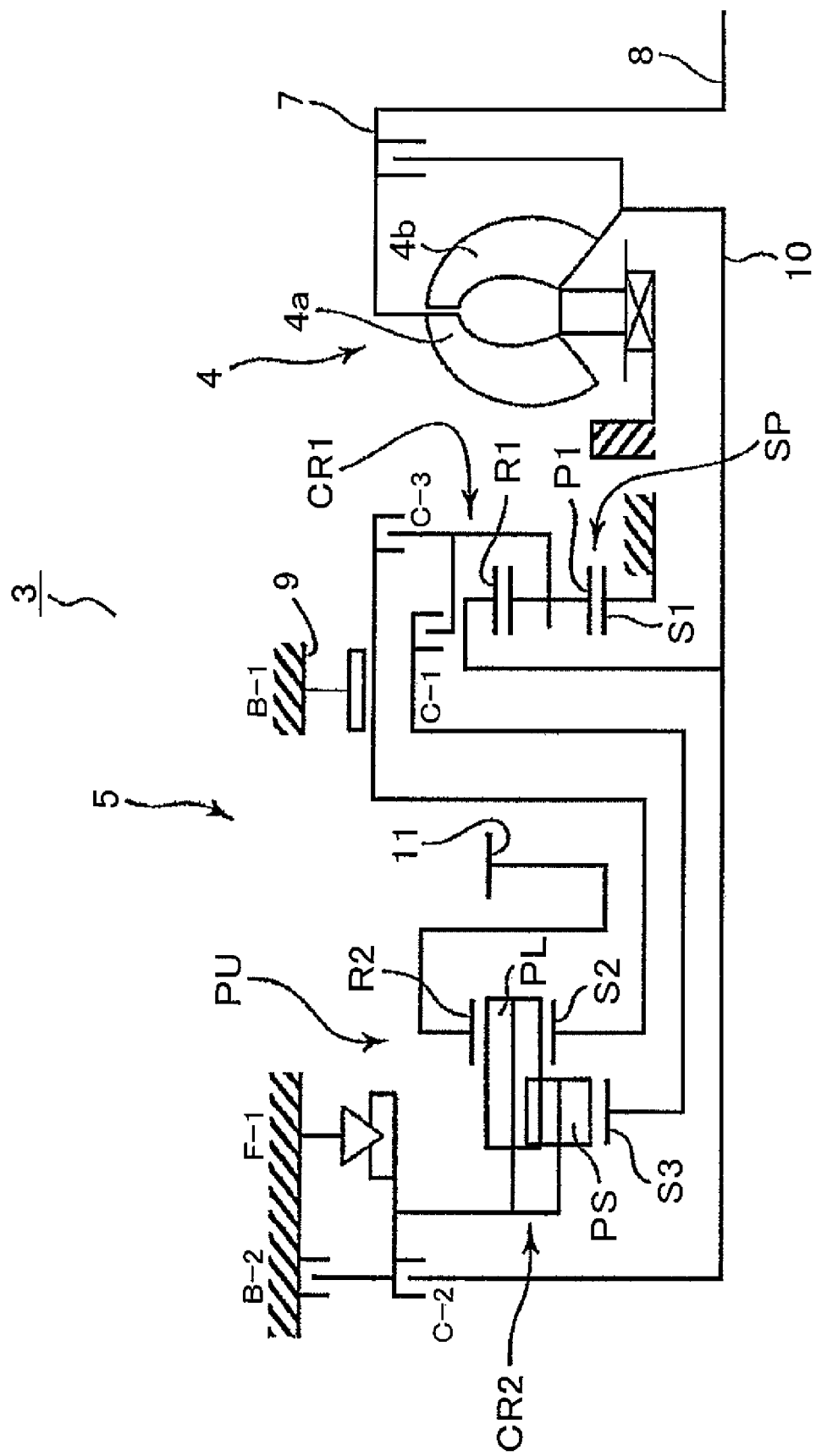
[FIG. 2]

First, the general structure of an automatic transmission 3 to which the present invention can be applied will be described with reference to FIG. 2. As shown in FIG. 2, the preferable automatic transmission 3 used in a FF (front engine, front drive) type vehicle, for example, has an input shaft 8 of the automatic transmission that can be connected to an engine (not shown), and a torque converter 4 and an automatic speed change mechanism 5 which are centered on the axial direction of the input shaft 8.

The torque converter 4 has a pump impeller 4a that is connected to the input shaft 8 of the automatic transmission 3, and a turbine runner 4b to which the rotation of the pump impeller 4a is transferred via hydraulic fluid. The turbine runner 4b is connected to an input shaft 10 of the automatic speed change mechanism 5, which is arranged on the same axis as the input shaft 8. Also, a lockup clutch 7 is provided with the torque converter 4. When the lockup clutch 7 is applied, the rotation of the input shaft 8 of the automatic transmission 3 is directly transferred to the input shaft 10 of the automatic speed change mechanism 5.

A planetary gear set SP and a planetary gear unit PU are provided on the input shaft 10 in the automatic speed change mechanism 5. The planetary gear set SP includes a sun gear S1, a carrier CR1, and a ring gear R1. The planetary gear set SP is a so-called single pinion planetary gear set, and has a pinion P1 that is engaged with the sun gear S1 and the ring gear R1, on the carrier CR1.

Also, the planetary gear unit PU has, as four rotating elements, a sun gear S2, a sun gear S3, a carrier CR2, and a ring gear R2. This planetary gear unit PU is a so-called Ravigneaux type planetary gear set, and has a long pinion PL that is engaged with the sun gear S2 and the ring gear R2, and a short pinion PS that is engaged with the sun gear S3 and the long pinion PL, on the carrier CR2.

The sun gear S1 of the planetary gear set SP is connected to a boss portion, not shown, that is integrally fixed to a transmission case 9, and is thus held stationary. Also, the ring gear R1 rotates together with the input shaft 10 (thereinafter this rotation will be referred to as "input rotation"). Furthermore, the carrier CR1 rotates at a decelerated rotation, which is input rotation that has been slowed by the sun gear S1 that is held stationary and the ring gear R1 that rotates at the input rotation, and is connected to a clutch C-1 and a clutch C-3.

The sun gear S2 of the planetary gear unit PU is connected to a brake B-1, which is formed by a band brake, and is thus able to be fixed to the transmission case 9. The sun gear S2 of the planetary gear unit PU is also connected to the clutch C-3, such that the decelerated rotation of the carrier CR1 can be input via the clutch C-3. Also, the sun gear S3 is connected to a clutch C-1, such that the decelerated rotation of the carrier CR1 can be input.

Moreover, the carrier CR2 is connected to a clutch C-2 to which the rotation of the input shaft 10 is input, such that the input rotation can be input via the clutch C-2. The carrier CR2 is also connected to a one-way clutch F-1 and a brake B-2, such that one-way rotation with respect to the transmission case 9 is restricted by the one-way clutch F-1, and the carrier C2 can be held stationary by the brake B-2. The ring gear R2 is connected to a counter gear 11. This counter gear 11 is connected to a driving wheel via a counter shaft and a differential unit, not shown.

Operation of Each Speed in the Automatic Transmission

Figure 4:
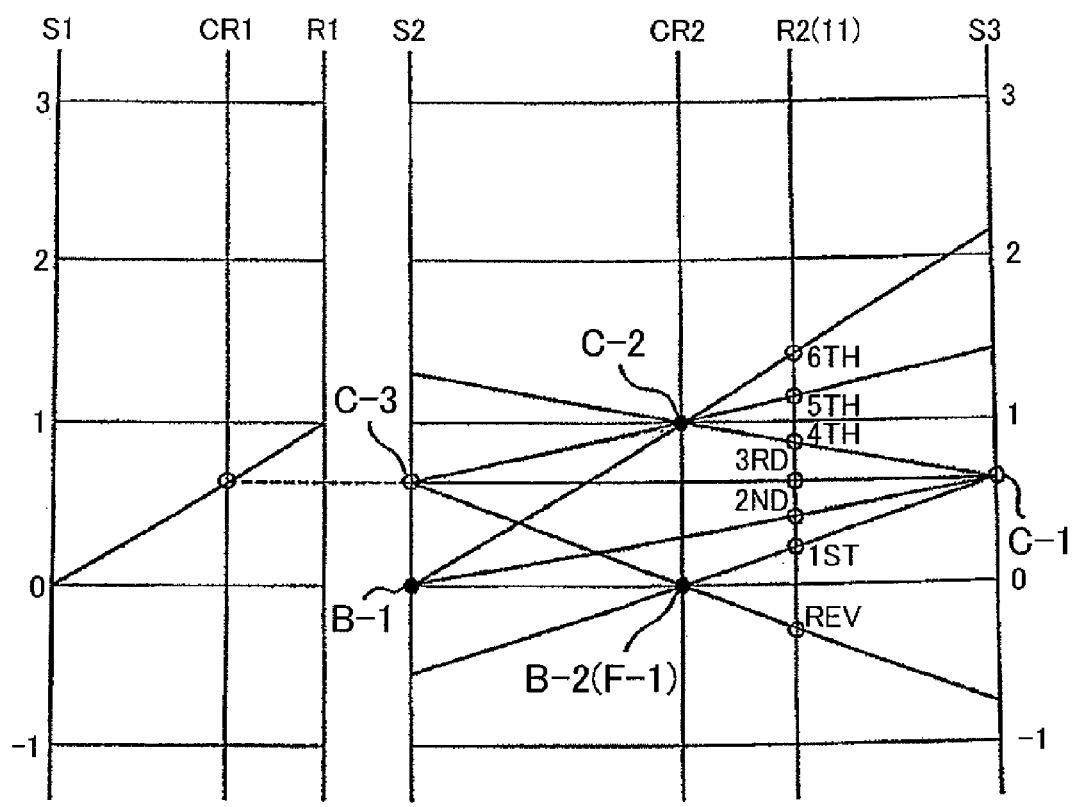
[FIG. 4]

Continuing on, the operation of the automatic speed change mechanism 5 will now be described with respect to FIGS. 2, 3, and 4, based on the structure described above. Incidentally, in the velocity diagram shown in FIG. 4, the direction along the vertical axes indicates the rotation speed of each rotating element (i.e., each gear), and the direction along the horizontal axes indicates the gear ratios of those rotating elements. Also, in the portion of the velocity diagram that corresponds to the planetary gear set SP, the vertical axes correspond to the sun gear S1, the carrier CR1, and the ring gear R1, in that order from the left in FIG. 4. Moreover, in the portion of the velocity diagram that corresponds to the planetary gear unit PU, the vertical axes correspond to the sun gear S3, the ring gear R2, the carrier CR2, and the sun gear S2, in that order from the right in FIG. 4.

When in forward first speed (1ST) in the D-range (drive range), for example, the clutch C-1 and the one-way clutch F-1 are applied, as shown in FIG. 3. In this state, the rotation of the input shaft 10 is input to the ring gear R1, where the rotation speed of the input shaft 10 is reduced by the fixed sun gear S1 and the ring gear R1, and this decelerated rotation is output from the carrier CR1, as shown in FIGS. 2 to 4. The output rotation from the carrier CR1 is input to the sun gear S3 via the clutch C-1. Also, the rotation of the carrier CR2 is limited to one direction (i.e., the direction of forward rotation). That is, the carrier CR2 is prevented from rotating in reverse and becomes fixed. When this happens, the decelerated rotation input to the sun gear S3 is output to the ring gear R2 via the fixed carrier CR2, such that forward rotation corresponding to forward first speed is output from the counter gear 11.

Incidentally, when the engine brake is applied (i.e., when coasting), the first forward speed is maintained with the brake B-2 being applied to hold the carrier CR2 stationary so as to prevent forward rotation of the carrier CR2. Also, in the forward first speed, the one-way clutch F-1 prevents reverse rotation of the carrier CR2 and allows forward rotation. Therefore, forward first speed when shifting from a non-running range to a running range, for example, is able to be achieved smoothly by automatically applying the one-way clutch F-1.

In forward second speed (2ND), the clutch C-1 and the brake B-1 are applied, as shown in FIG. 3. In this state, the rotation of the input shaft 10 is input to the ring gear R1, where the rotation speed of the input shaft 10 is reduced by the fixed sun gear S1 and the ring gear R1, and this decelerated rotation is output from the carrier CR1, as shown in FIGS. 2 to 4. The output rotation from the carrier CR1 is input to the sun gear S3 via the clutch C-1. Also, the sun gear S2 is held stationary by the brake B-1 being applied. In this state, the carrier CR2 rotates at a decelerated rotation that is slower than the rotation of the sun gear S3. The decelerated rotation input to the sun gear S3 is output to the ring gear R2 via the carrier CR2, such that forward rotation corresponding to forward second speed is output from the counter gear 11.

In forward third speed (3RD), the clutch C-1 and the clutch C-3 are applied, as shown in FIG. 3. In this state, the rotation of the input shaft 10 is input to the ring gear R1, where the rotation speed of the input shaft 10 is reduced by the fixed sun gear S1 and the ring gear R1, and this decelerated rotation is output from the carrier CR1, as shown in FIGS. 2 to 4. The output rotation from the carrier CR1 is input to the sun gear S3 via the clutch C-1. Also, the decelerated rotation of the carrier CR1 is also input to the sun gear S2 by the clutch C-3 being applied. That is, the decelerated rotation of the carrier CR1 is input to both the sun gear S2 and the sun gear S3, so the planetary gear unit PU is in a decelerated rotation direct-drive state. The decelerated rotation is output as it is to the ring gear R2, such that forward rotation corresponding to forward third speed is output from the counter gear 11.

In forward fourth speed (4TH), the clutch C-1 and the clutch C-2 are applied, as shown in FIG. 3. In this state, the rotation of the input shaft 10 is input to the ring gear R1, where the rotation speed of the input shaft 10 is reduced by the fixed sun gear S1 and the ring gear R1, and this decelerated rotation is output from the carrier CR1, as shown in FIGS. 2 to 4. The output rotation from the carrier CR1 is input to the sun gear S3 via the clutch C-1. Also, the input rotation is also input to the carrier CR2 by the clutch C-2 being applied. In this state, the decelerated rotation that is input to the sun gear S3 and the input rotation that is input to the carrier CR2 result in a decelerated rotation that is faster than that of forward third speed, and this decelerated rotation is output to the ring gear R2, such that forward rotation corresponding to forward fourth speed is output from the counter gear 11.

In forward fifth speed (5TH), the clutch C-2 and the clutch C-3 are applied, as shown in FIG. 3. In this state, the rotation of the input shaft 10 is input to the ring gear R1, where the rotation speed of the input shaft 10 is reduced by the fixed sun gear S1 and the ring gear R1, and this decelerated rotation is output from the carrier CR1, as shown in FIGS. 2 to 4. The output rotation from the carrier CR1 is input to the sun gear S2 via the clutch C-3. Also, the input rotation is input to the carrier CR2 by the clutch C-2 being applied. In this state, the decelerated rotation that is input to the sun gear S2 and the input rotation that is input to the carrier CR2 result in an accelerated rotation that is slightly faster than the input rotation, and this accelerated rotation is output to the ring gear R2, such that forward rotation corresponding to forward fifth speed is output from the counter gear 11.

In forward sixth speed (6TH), the clutch C-2 and the brake B-1 are applied, as shown in FIG. 3. In this state, input rotation is input to the carrier CR2 by the clutch C-2 being applied, and the sun gear S2 is held stationary by the brake B-1 being applied, as shown in FIGS. 2 to 4. Therefore, the fixed sun gear S2 causes the input rotation of the carrier CR2 to be an accelerated rotation that is faster than the rotation in forward fifth speed. This accelerated rotation is output to the ring gear R2, such that forward rotation corresponding to forward sixth speed is output from the counter gear 11.

In reverse first speed (REV), the clutch C-3 and the brake B-2 are applied, as shown in FIG. 3. In this state, the rotation of the input shaft 10 is input to the ring gear R1, where the rotation speed of the input shaft 10 is reduced by the fixed sun gear S1 and the ring gear R1, and this decelerated rotation is output from the carrier CR1, as shown in FIGS. 2 to 4. The output rotation from the carrier CR1 is input to the sun gear S2 via the clutch C-3. Also, the carrier CR2 is held stationary by the brake B-2 being applied. In this state, the decelerated rotation that is input to the sun gear S2 is output to the ring gear R2 via the fixed carrier CR2, such that reverse rotation corresponding to reverse first speed is output from the counter gear 11.

Incidentally, in the P-range (parking range) and the N-range (neutral range), for example, the clutch C-1, the clutch C-2, and the clutch C-3 are all released. In this state, the carrier CR1 is disconnected from the sun gear S2 and the sun gear S3, i.e., the planetary gear set SP is disconnected from the planetary gear unit PU, and the input shaft 10 is disconnected from the carrier CR2. Accordingly, the transmission of power between the input shaft 10 and the planetary gear unit PU is interrupted, i.e., the transmission of power between the input shaft 10 and the counter shaft 11 is interrupted.

General Structure of the Hydraulic Control Apparatus

Continuing on, a hydraulic control apparatus 6 of the automatic transmission according to the present invention will be described. First, the portions of the hydraulic control apparatus that generate line pressure, secondary pressure, modulator pressure, and range pressure and the like, which are not shown, will be described briefly. Incidentally, the portions that generate the line pressure, the secondary pressure, the modulator pressure, and the range pressure are similar to those of a hydraulic control apparatus of a typical automatic transmission and are well known so they will be described only briefly.

This hydraulic control apparatus 6 includes an oil pump, a manual shift valve, a primary regulator valve, a secondary regulator valve, a solenoid modulator valve, and a linear solenoid valve SLT and the like, none of which are shown, for example. When the engine is started, for example, the oil pump which is drivingly connected to the pump impeller 4a of the torque converter 4 is driven in conjunction with the operation of the engine, such that hydraulic pressure is generated by drawing oil (i.e., hydraulic fluid) up from an oil pan, not shown, via a strainer.

The hydraulic pressure generated by the oil pump is regulated to a line pressure $P_L$ while being discharge-regulated by the primary regulator valve, based on a signal pressure $P_{SLT}$ of the linear solenoid valve SLT, which is regulated and output according to a throttle opening amount. This line pressure $P_L$ is supplied to a manual valve (i.e., a range switching valve), the solenoid modulator valve, and a linear solenoid valve SLC3 that will be described in detail later, and the like. The line pressure $P_L$ supplied to the solenoid modulator valve is regulated to a modulator pressure $P_{MOD}$ that becomes a substantially constant pressure by that valve. This modulator pressure $P_{MOD}$ is supplied as the base pressure of the linear solenoid valve SLT and solenoid valves S1 and S2, which will be described in detail later, and the like.

Incidentally, the pressure discharged from the primary regulator valve is regulated to a secondary pressure $P_{SEC}$ while being further discharge-regulated by the secondary regulator valve, for example. This secondary pressure $P_{SEC}$ is supplied to a lubricating oil passage and an oil cooler and the like, for example, as well as to the torque converter 4, and is also used to control the lock-up clutch 7.

Meanwhile, the manual shift valve (not shown) has a spool that is mechanically (or electrically) driven by a shift lever provided near a driver's seat (not shown). This manual shift valve is placed in an output state, in which it outputs the input line pressure $P_L$, or a non-output state (i.e., a drain state), in which it does not output the input line pressure $P_L$ (i.e., in which it drains pressure), by the position of the spool being switched according to the shift range (e.g., P, R, N, D) selected with the shift lever.

More specifically, when the D-range is selected based on an operation of the shift lever, an input port into which the line pressure $P_L$ is input is communicated with a forward range pressure output port based on the position of the spool, such that line pressure $P_L$ is output as forward range pressure (i.e., D-range pressure) $P_D$ from the forward range pressure output port. When the R-range (reverse range) is selected based on an operation of the shift lever, the input port is communicated with a reverse range pressure output port based on the position of the spool, such that line pressure $P_L$ is output as reverse range pressure (i.e., R-range pressure) $P_{REV}$ from the reverse range pressure output port. Also, when the P-range and the N-range are selected based on an operation of the shift lever, the spool cuts off communication between the input port and both the forward range pressure output port and the reverse range pressure output port, and the forward range pressure output port and the reverse range pressure output port are both communicated with a drain port, i.e., the manual shift valve is placed in the non-output state in which the D-range pressure $P_D$ and the R-range pressure $P_{REV}$ are drained (i.e., discharged).

Detailed structure of the shift control portion of the hydraulic control apparatus Next, the portion that mainly performs shift control in the hydraulic control apparatus 6 according to the present invention will be described with reference to FIG. 5. Incidentally, in this example embodiment, the position on the right side in FIG. 5 will be referred to as the "right side position" and the position on the left side will be referred to as the "left side position" in order to describe the valve position (or more specifically, the spool position).

The hydraulic control apparatus 6 includes four linear valves (apply pressure control solenoid valves) SLC1, SLC2, SLC3, and SLB1 for directly supplying regulated output pressure as apply pressure to a total of five hydraulic servos, i.e., a hydraulic servo 41 of the clutch C-1 described above, a hydraulic servo 42 of the clutch C-2, a hydraulic servo 43 of the clutch C-3, a hydraulic servo 44 of the brake B-1, and a hydraulic servo 45 of the brake B-2. The hydraulic control apparatus 6 also includes, as a portion that achieves a limp-home function and switches the output pressure of the linear solenoid valve SLC2 to the hydraulic servo 42 of the clutch C-2 or the hydraulic servo 45 of the brake B-2, a solenoid valve (a first signal solenoid valve) S1, a solenoid valve (a second signal solenoid valve) S2, a first clutch apply relay valve 21, a second clutch apply relay valve 22, a C-2 relay valve (a distribution switching valve) 23, and a B-2 relay valve (a forward-reverse switching valve) 24, and the like.

Figure 5:
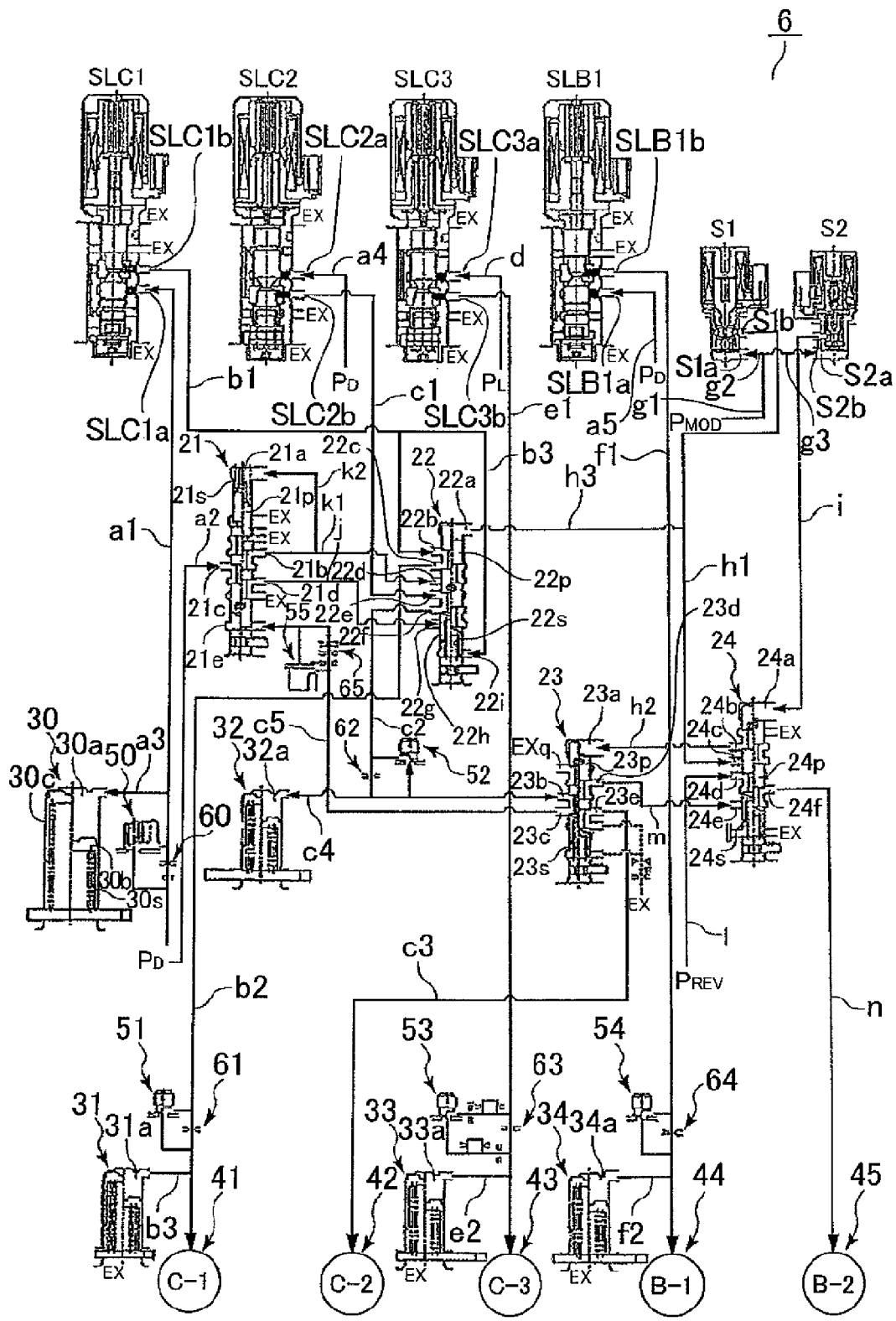
[FIG. 5]

The forward range pressure output port (not shown) of the manual shift valve described above is connected to a fluid passage a1, a fluid passage a2, a fluid passage a4, and a fluid passage a5 shown in FIG. 5, such that the forward range pressure $P_D$ can be input to those fluid passages. Also, the reverse range pressure output port (not shown) of the manual shift valve is connected to a fluid passage 1, such that the reverse range pressure $P_{REV}$ can be input to that fluid passage. Further, the line pressure $P_L$ from the primary regulator valve (not shown) is input to a fluid passage d, and the modulator pressure $P_{MOD}$ from the modulator valve (not shown) is input to a fluid passage g1.

The fluid passage a2 is connected to an input port 21c of the first clutch apply relay valve 21, which will be described in detail later. A check valve 50 and an orifice 60 are arranged in the fluid passage a2. Also, the fluid passage a1 is connected to an accumulator 30 via a fluid passage a3, and is also connected to the linear solenoid valve SLC1. The accumulator 30 includes a case 30c, a piston 30b arranged inside the case 30c, a spring 30s that urges the piston 30b, and a fluid chamber 30a formed between the case 30c and the piston 30b.

The linear solenoid valve SLC1 is a normally closed type of solenoid valve that is in the non-output state when de-energized, and has an input port SLC1a that receives the forward range pressure $P_D$ via the fluid passage a1, and an output port SLC1b which regulates the forward range pressure $P_D$ and outputs a control pressure $P_{SLC1}$ as an apply pressure $P_{C1}$ to the hydraulic servo 41. That is, when de-energized, the linear solenoid valve SLC1 is in the non-output state in which it cuts off the input port SLC1a from the output port SLC1b, and when energized based on a command value from a control unit (ECU) 70, the linear solenoid valve SLC1 is able to increase the amount by which the input port SLC1a is communicated with the output port SLC1b (i.e., the opening amount) according to the command value, i.e., is able to output the apply pressure $P_{C1}$ according to the command value. The output port SLC1b of the linear solenoid valve SLC1 is connected to an input port 22i of the second clutch apply relay valve 22, which will be described later, via a fluid passage b1.

Meanwhile, the linear solenoid valve SLC2 is a normally open type of solenoid valve that is in the output state when de-energized, and has an input port SLC2a that receives the forward range pressure $P_D$ via the fluid passage a4 and the like, and an output port SLC2b which regulates the forward range pressure $P_D$ and outputs a control pressure (forward hydraulic pressure) $P_{SLC2}$ as an apply pressure $P_{C2}$ (or apply pressure $P_{B2}$) to the hydraulic servo 42. That is, when de-energized, the linear solenoid valve SLC2 is in the output state in which it communicates the input port SLC2a with the output port SLC2b, and when energized based on a command value from the control unit (ECU) 70, the linear solenoid valve SLC2 is able to decrease the amount by which the input port SLC2a is communicated with the output port SLC2b according to the command value (i.e., reduce the opening amount), i.e., is able to output the apply pressure $P_{C2}$ (or $P_{B2}$) according to the command value. The output port SLC2b of the linear solenoid valve SLC2 is connected to an input port 22e of the second clutch apply relay valve 22, which will be described later, via a fluid passage c1.

The linear solenoid valve SLC3 is a normally open type of solenoid valve that is in the output state when de-energized, and has an input port SLC3a that receives the line pressure $P_L$ via the fluid passage d and the like, and an output port SLC3b which regulates the line pressure $P_L$ and outputs a control pressure $P_{SLC3}$ as an apply pressure $P_{C3}$ to the hydraulic servo 43. That is, when de-energized, the linear solenoid valve SLC3 is in the output state in which it communicates the input port SLC3a with the output port SLC3b, and when energized based on a command value from the control unit (ECU) 70, the linear solenoid valve SLC3 is able to decrease the amount by which the input port SLC3a is communicated with the output port SLC3b according to the command value (i.e., reduce the opening amount), i.e., is able to output the apply pressure $P_{C3}$ according to the command value. The output port SLC3b of the linear solenoid valve SLC3 is connected to the hydraulic servo 43 of the clutch C-3 via the fluid passage e1. Also, a check valve 53 and an orifice 63 are arranged in the fluid passage e1, and a fluid chamber 33a of a C-3 damper 33 is connected to the fluid passage e1 via a fluid passage e2. Incidentally, the C-3 damper 33 has a structure similar to that of the accumulator 30 described above and is a typical damper device, so it will not be described in detail.

The linear solenoid valve SLB1 is a normally closed type of solenoid valve that is in the non-output state when de-energized, and has an input port SLB1a that receives the forward range pressure $P_D$ via the fluid passage a5 and the like, and an output port SLB1b which regulates the forward range pressure $P_D$ and outputs a control pressure $P_{SLB1}$ as an apply pressure $P_{B1}$ to the hydraulic servo 44. That is, when de-energized, the linear solenoid valve SLB1 is in the non-output state in which it cuts off the input port SLB1a from the output port SLB1b, and when energized based on a command value from a control unit (ECU) 70, the linear solenoid valve SLB1 is able to increase the amount by which the input port SLB1a is communicated with the output port SLB1b (i.e., the opening amount) according to the command value, i.e., is able to output the apply pressure $P_{B1}$ according to the command value. The output port SLB1b of the linear solenoid SLB1 is connected to the hydraulic servo 44 of the brake B-1 via a fluid passage f1. Also, a check valve 54 and an orifice 64 are arranged in the fluid passage f1, and a fluid chamber 34a of a B-1 damper 34 is connected to the fluid passage f1 via a fluid passage f2.

The solenoid valve S1 is a normally open type of solenoid valve that is in the output state when de-energized, and has an input port S1a that receives the modulator pressure $P_{MOD}$ via fluid passages g1 and g2, and an output port S1b which outputs the modulator pressure $P_{MOD}$ substantially unchanged as a signal pressure $P_{S1}$ when de-energized (i.e., when off). The output port S1b is connected to an input port 24c of the B-2 relay valve 24 via a fluid passage h1.

The solenoid valve S2 is a normally closed type of solenoid valve that is in the non-output state when de-energized, and has an input port S2a that receives the modulator pressure $P_{MOD}$ via fluid passages g1 and g3, and an output port S2b which outputs the modulator pressure $P_{MOD}$ substantially unchanged as a signal pressure $P_{S2}$ when energized (i.e., when on). The output port S2b is connected to a fluid chamber 24a of a B-2 relay valve 24 via a fluid passage i.

The first clutch apply relay valve 21 has a spool 21p on which land portions are formed such that the upper side in the drawing has a small diameter and the lower side in the drawing has a large diameter, and a spring (a first urging mechanism) 21s that urges the spool 21p downward in the drawing. The first clutch apply relay valve 21 also has a fluid chamber 21a above the spool 21p in the drawing, and a fluid chamber 21e below the spool 21p in the drawing, as well as an output port 21b, an input port 21c, an output port 21d, and a drain port EX.

When the spool 21p of the first clutch apply relay valve 21 is in the right side position (lower speed position) by the apply pressure $P_{C1}$ (control pressure $P_{SLC1}$) of the clutch C-1 and the spring 21s, the input port 21c is communicated with the output port 21b, and the input port 21c is cut off from the output port 21d, and the output port 21d is communicated with the drain port EX. When the spool 21p of the first clutch apply relay valve 21 is in the left side position (higher speed position) by the apply pressure $P_{C2}$ (control pressure $P_{SLC2}$) of the clutch C-2 and the signal pressure $P_{S1}$, the input port 21c is communicated with the output port 21d, and the input port 21c is cut off from the output port 21b, and the output port 21b is communicated with the drain port EX.

The forward range pressure $P_D$ is input to the input port 21c via the fluid passage a2. When the spool 21p is in the right side position, the output port 21b which is communicated with the input port 21c is connected to the input port 22d of the second clutch apply relay valve 22 via a fluid passage k1, and is also connected to the fluid chamber 21a via a fluid passage k2. Also, when the spool 21p is in the left side position, the output port 21d which is communicated with the input port 21c is connected to an input port 22g of the second clutch apply relay valve 22 via a fluid passage j. The fluid chamber 21e described above is connected to the hydraulic servo 42 of the clutch C-2 via a fluid passage c5 and a C-2 relay valve 23. That is, when operating normally, the fluid chamber 21e is connected to the output port SLC2b of the linear solenoid valve SLC2 via the second clutch apply relay valve 22.

Meanwhile, the second clutch apply relay valve 22 has a spool 22p and a spring 22s that urges the spool 22p upward in the drawing. The second clutch apply relay valve 22 also has a fluid chamber (a second fluid chamber) 22a above the spool 22p in the drawing, and a fluid chamber 22h below the spool 22p in the drawing, as well as an input port 22b, an output port 22c, an input port 22d, an input port 22e, an output port 22f, and an input port 22g.

When the spool 22p of the second clutch apply relay valve 22 is in the left side position (which is the position during normal operation), the input port 22b is communicated with the output port 22c, and the input port 22e is communicated with the output port 22f, while the input ports 22d and the input port 22g are both cut off. When the spool 22p of the second clutch apply relay valve 22 is in the right side position (which is the position during a failure), the input port 22d is communicated with the output port 22c, and the input port 22g is communicated with the output port 22f, while the input port 22b is cut off from the output port 22c.

The fluid chamber 22a of the second clutch apply relay valve 22 is connected to the output port S1b of the solenoid valve S1 via a fluid passage h3. Also, the fluid chamber 22h described above is connected to the output port SLC1b of the linear solenoid valve SLC1 via a fluid passage b3 that is connected to the fluid passage b1.

The input port 22b of the second clutch apply relay valve 22 is connected to the output port SLC1b of the linear solenoid valve SLC1 via the fluid passage b 1, and the output port 22c, which is communicated with the input port 22b when the spool 22p is in the left side position and is communicated with the input port 22d when the spool 22p is in the right side position, is connected to the hydraulic servo 41 of the clutch C-1 via a fluid passage b2. Meanwhile, the input port 22e is connected to the output port SLC2b of the linear solenoid valve SLC2 via a fluid passage c 1, and the output port 22f, which is communicated with the input port 22e when the spool 22p is in the left side position and is communicated with the input port 22g when the spool 22p is in the right side position, is connected to the hydraulic servo 42 of the clutch C-2 via a fluid passage c2, the C-2 relay valve 23, and a fluid passage c3. A check valve 52 and an orifice 62 are arranged in the fluid passage c2, and a fluid chamber 32a of a C2-B2 damper 32 is connected to the fluid chamber c2 via a fluid passage c4.

The C-2 relay valve 23 has a spool 23p and a spring 23s that urges the spool 23p upward in the drawing. The C-2 relay valve 23 also has a fluid chamber 23a above the spool 23p in the drawing, as well as an input port 23b, an output port 23c, an output port 23d, an output port 23e, and drain ports EXq and EX.

When the spool 23p of the C-2 relay valve 23 is in the left side position, the input port 23b is communicated with the output port 23c and the output port 23e, and the output port 23d is communicated with the drain port EXq. When the spool 23p is in the right side position, the input port 23b is communicated with the output port 23d, and the output port 23c and the output port 23e are communicated with the drain port EXq.

The fluid chamber 23a is connected to an output port 24b of the B-2 relay valve 24, which will be described later, via a fluid passage h2. The input port 23b is connected to the output port 22f of the second clutch apply relay valve 22 via the fluid passage c2, and the output port 23e, which is communicated with the input port 23b when the spool 23p is in the left side position, is connected to the hydraulic servo 42 of the clutch C-2 via the fluid passage c3. Similarly, the output port 23c, which is communicated with the input port 23b when the spool 23p is in the left side position, is connected to the fluid passage 21e of the first clutch apply relay valve 21 via the fluid passage c5. Also, a check valve 55 and an orifice 65 are provided in the fluid passage c5. The output port 23d, which is communicated with the input port 23b when the spool 23p is in the right side position, is connected to an input port 24e of the B-2 relay valve 24 via a fluid passage m.

The B-2 relay valve 24 has a spool 24p and a spring 24s that urges the spool 24p upward in the drawing. The B-2 relay valve 24 also has the fluid chamber 24a above the spool 24p in the drawing, as well as an output port 24b, an input port 24c, an input port (a second input port) 24d, an input port (a first input port) 24e, an output port 24f, and a drain port EX.

When the spool 24p of the B-2 relay valve 24 is in the left side position, the input port 24d is communicated with the output port 24f, and the output port 24b is communicated with the drain port EX and cut off from the input port 24c. When the spool 24p is in the right side position, the input port 24c is communicated with the output port 24b, and the input port 24e is communicated with the output port 24f, and the input port 24d is cut off from the drain port EX.

The fluid chamber 24a is connected to the output port S2b of the solenoid valve S2 via the fluid passage i. The input port 24d is connected to the reverse range pressure output port (not shown) of the manual shift valve from which the rear range pressure (reverse hydraulic pressure) $P_{REV}$ is output via the fluid passage l, and the input port 24e is connected to the output port 23d of the C-2 relay valve 23 via the fluid passage m. The output port 24f, which is communicated with the input port 24d when the spool 24p is in the left side position and is communicated with the input port 24e when the spool 24p is in the right side position, is connected to the hydraulic servo 45 of the brake B-2 via a fluid passage n. That is, the hydraulic servo 45 of the brake B-2 is connected to the reverse range pressure output port (not shown) of the manual shift valve, or the output port SLC2b of the linear solenoid valve SLC2. Also, as described above, the input port 24c is connected to the output port S1b of the solenoid valve S1 via the fluid passage h1, and the output port 24b, which is communicated with the input port 24c when the spool 24p is in the right side position, is connected to the fluid chamber 23a of the C-2 relay valve 23 via the fluid passage h2.

Operation of the Hydraulic Control Apparatus

Next, the operation of the hydraulic control apparatus 6 according to this example embodiment will be described.

Hydraulic control of this hydraulic control apparatus 6 starts when the ignition is turned on by the driver, for example. First, when the selected position of the shift lever is the P-range or the N-range, for example, the linear solenoid valve SLC2, the linear solenoid valve SLC3, and the solenoid valve S1, which are normally open types of solenoid valves, are energized by electrical commands from the control unit, not shown, such that the input ports and the output ports of those valves are cut off from one another. Next, when the engine is started, for example, hydraulic pressure is generated by the operation of the oil pump (not shown) which is based on engine operation. This hydraulic pressure is regulated to the line pressure $P_L$ by the primary regulator valve and to the modulator pressure $P_{MOD}$ by the solenoid modulator valve, as described above, and output. The line pressure $P_L$ is input to the input port of the manual shift valve, not shown, and the input port SLC3a of the linear solenoid valve SLC3 via the fluid passage d, while the modulator pressure $P_{MOD}$ is input to the input ports S1a and S2a of the solenoid valves S1 and S2 via the fluid passages g1, g2, and g3.

Continuing on, when driver shifts the shift lever from the N-range position to the D-range position and the control unit determines that the speed is forward first speed, forward second speed, or forward third speed, for example, the forward range pressure $P_D$ is output from the forward range pressure output port of the manual shift valve to the fluid passages a1 to a5, and forward range pressure $P_D$ is input to the input port 21c of the first clutch apply relay valve 21 via the fluid passage a2. In this state, control pressure $P_{SLC2}$ is not output from the linear solenoid valve SLC2 (i.e., not input to the fluid chamber 21e) in forward first to forward third speeds (see FIG. 2), so the first clutch apply relay valve 21 is placed in the right side position by the urging force of the spring 21s, and forward range pressure $P_D$ is output as a first preparation pressure $P_{DC1}$ from the output port 21b to the fluid passage k1. However, in the second clutch apply relay valve 22 which is in the left side position by the urging force of the spring 22s because the signal pressure $P_{S1}$ is not being output due to the solenoid valve S1 being on, the input port 22d is cut off. Also at this time, the first preparation pressure $P_{DC1}$ (i.e., the forward range pressure $P_D$) is input to the fluid chamber 21a via the fluid passage k2, so the spool 21p is stably retained in the left side position. Incidentally, the hydraulic pressure in the fluid passage j (i.e., the second preparation pressure $P_{DC2}$) is drained because the output port 21d is communicated with the drain port EX.

Then, as described above, the control pressure $P_{SLC1}$ input to the input port 22b of the second clutch apply relay valve 22 from the linear solenoid valve SLC1 is output as apply pressure $P_{C1}$ from the output port 22c to the hydraulic servo 41 via the fluid passage b2, such that the clutch C-1 is applied. As a result, forward first speed is established with the application of the one-way clutch F-1.

Also, a check valve 51 and an orifice 61 are arranged in the fluid passage b2. When supplying the apply pressure $P_{C1}$ (i.e., the control pressure $P_{SLC1}$) to the hydraulic servo 41, the check valve 51 closes so hydraulic pressure is moderately supplied via only the orifice 61. When discharging the apply pressure $P_{C1}$ from the hydraulic servo 41, the check valve 51 is opened so the rate at which the hydraulic pressure discharges is much faster than the rate at which it is supplied. Further, the apply pressure $P_{C1}$ supplied to the fluid passage b2 is input to a fluid chamber 31a of a C-1 damper 31 via the fluid passage b3. This C-1 damper 31 prevents pulsations in the apply pressure $P_{C1}$ that is supplied to and discharged from the hydraulic servo 41, and absorbs surge pressure (rapidly fluctuating pressure), and the like.

Operation of the Engine Brake in Forward First Speed

Also, when the control unit determines that the engine brake is applied in forward first speed, for example, the solenoid valve S2 is turned on, the solenoid valve S1 is turned off, and the linear solenoid valve SLC2 is controlled to regulate pressure, all according to electrical commands from the control unit 70. When the solenoid valve S2 is turned on, the modulator pressure $P_{MOD}$ input to the input port S2a via the fluid passages g1 and g3 is output as a signal pressure $P_{S2}$ by the output port S2b, and input to the fluid chamber 24a of the B-2 relay valve 24 via the fluid passage i, forcing the spool 24p downward in the drawing against the urging force of the spring 24s, such that the B-2 relay valve 24 is placed in the right side position.

Also, when the solenoid valve S1 is turned off, the modulator pressure $P_{MOD}$ input to the input port S1a via the fluid passages g1 and g2 is output as a signal pressure $P_{S1}$ from the output port S1b and input to the input port 24c of the B-2 relay valve 24 via the fluid passage h1, as well as input to the fluid chamber 23a of the C-2 relay valve 23 via the fluid passage h2 from the output port 24b of the B-2 relay valve 24 that is in the right side position. In this state, the spool 23p of the C-2 relay valve 23 is forced downward in the drawing against the urging force of the spring 23s by the signal pressure $P_{S1}$ input to the fluid chamber 23a, such that the C-2 relay valve 23 is placed in the right side position.

Then when the linear solenoid valve SLC2 is controlled to regulate the pressure and the control pressure $P_{SLC2}$ is output from the output port SLC2b, the control pressure $P_{SLC2}$ is input via the fluid passage c1 to the input port 22e of the second clutch apply relay valve 22 that is locked in the left side position, and then output as the apply pressure $P_{B2}$ to the fluid passage c2 from the output port 22f.

The apply pressure $P_{B2}$ output to the fluid passage c2 is input to the input port 23b of the C-2 relay valve 23 that is in the right side position, and then output from the output port 23d. Further, the apply pressure $P_{B2}$ is input via the fluid passage m to the input port 24e of the B-2 relay valve 24 that is in the right side position, and then output from the output port 24f, and input to the hydraulic servo 45 via the fluid passage n, such that the brake B-2 applies. As a result, the engine brake in forward first speed is applied with the application of the clutch C-1.

Incidentally, the check valve 52 and the orifice 62 are arranged in the fluid passage c2. When supplying the apply pressure $P_{B2}$ to the hydraulic servo 45 of the brake B-2, the check valve 52 closes so hydraulic pressure is moderately supplied via only the orifice 62. Also, when discharging the apply pressure $P_{B2}$, which will be described later, the check valve 52 is opened so that the hydraulic pressure in the fluid passage c2 discharges rapidly. Further, the apply pressure $P_{B2}$ supplied to the fluid passage c2 is input to a fluid chamber 32a of a C2-B2 damper 32 via the fluid passage c4. This C2-B2 damper 32 prevents pulsations in the apply pressure $P_{B2}$ that is supplied to and discharged from the hydraulic servo 45, and absorbs surge pressure (rapidly fluctuating pressure), and the like.

Also, when the control unit determines that the vehicle is in forward drive in forward first speed, i.e., when the control unit determines that the engine brake is released, the solenoid valve S1 is turned off and the linear solenoid valve SLC2 is closed by being turned on (i.e., energized), such that the control pressure $P_{SLC2}$ as the apply pressure $P_{B2}$ becomes 0 and is drained. Also, the apply pressure $P_{B2}$ of the hydraulic servo 45 of the brake B-2 is discharged from the drain port EXq via the input port 24e and the fluid passage m because the C-2 lever valve 23 switches to the left side position. As a result, the apply pressure $P_{B2}$ of the hydraulic servo 45 of the brake B-2 drains more quickly than it does via the linear solenoid valve SLC2 (i.e., quick drain is performed), such that the brake B-2 quickly releases. Incidentally, the hydraulic pressure in the fluid passages c1 and c2 is discharged from the drain port EX of the linear solenoid valve SLC2.

Also, the apply pressure $P_{B2}$ of the hydraulic servo 45 of the brake B-2 can also be discharged from the drain port of the manual valve via the fluid passages n and l by turning off the solenoid valve S2 so that the urging force of the spring 24s forces the B-2 relay valve 24 into the left side position thereby communicating the input port 24d with the output port 24f. The hydraulic pressure can be discharged from the drain port of the manual valve at this time without the reverse range pressure $P_{REV}$ being output to the fluid passage 1 because the range is the forward running range.

Operation in Forward Second Speed

Next, when the control unit determines that there is to be a shift from forward first speed to forward second speed, the linear solenoid valve SLC1 is maintained in a pressure regulating state and the linear solenoid valve SLB1 is controlled to regulate pressure, while the solenoid valve S1 is turned on, just as it is in forward first speed described above (except for when the engine brake is applied), and the solenoid valve S2 is also turned on, all according to electrical commands from the control unit 70.

That is, when the linear solenoid valve SLB1 is controlled to regulate the pressure, the control pressure $P_{SLB1}$ is output as the apply pressure $P_{B1}$ from the output port SLB1b, and input to the hydraulic servo 44 via the fluid passage f1, such that the brake B-1 applies. As a result, forward second speed is established with the application of the clutch C-1.

Also, the check valve 54 and the orifice 64 are arranged in the fluid passage f1. When supplying the apply pressure $P_{B1}$ to the hydraulic servo 44 of the brake B-1, the check valve 54 closes so hydraulic pressure is moderately supplied via only the orifice 64. Also, when discharging the apply pressure $P_{B1}$ from the hydraulic servo 44, the check valve 54 is opened so the rate at which the hydraulic pressure discharges is much faster than the rate at which it is supplied. Further, the apply pressure $P_{B1}$ supplied to the fluid passage f1 is input to the fluid chamber 34a of the B-1 damper 34 via the fluid passage f2. This B-1 damper 34 prevents pulsations in the apply pressure $P_{B1}$ that is supplied to and discharged from the hydraulic servo 44, and absorbs surge pressure (rapidly fluctuating pressure), and the like.

Operation in forward third speed Continuing on, when the control unit determines that there is to be a shift from forward second speed to forward third speed, the linear solenoid valve SLC1 is maintained in a pressure regulating state, the linear solenoid valve SLB1 is closed by being turned off, and the linear solenoid valve SLC3 is controlled to regulate pressure, while similarly the solenoid valve S1 and the solenoid valve S2 are both turned on, all according to electrical commands from the control unit 70.

That is, first, the brake B-1 is released by regulating the pressure with the linear solenoid valve SLB1, i.e., the apply pressure $P_{B1}$ of the hydraulic servo 44 of the brake B-1 (i.e., the control pressure $P_{SLB1}$) is discharged from the drain port EX of the linear solenoid valve SLB1 via the fluid passage f1 such that the brake B-1 releases. Also, the linear solenoid valve SLC3 is changed from being on (i.e., energized), in which it is closed to make the control pressure $P_{SLC3}$ 0, to regulating the pressure. This control pressure $P_{SLC3}$ is output as apply pressure $P_{C3}$ from the output port SLC3b, and input to the hydraulic servo 43 via the fluid passage e1, such that the clutch C-3 applies. As a result, forward third speed is established with the application of the clutch C-1.

Also, the check valve 53 and the orifice 63 are arranged in the fluid passage e1. When supplying the apply pressure $P_{C3}$ to the hydraulic servo 43 of the clutch C-3, the check valve 53 closes so hydraulic pressure is moderately supplied via only the orifice 63. Also, when discharging the apply pressure $P_{C3}$ from the hydraulic servo 43, the check valve 53 is opened so the rate at which the hydraulic pressure discharges is much faster than the rate at which it is supplied. Further, the apply pressure $P_{C3}$ supplied to the fluid passage e1 is input to the fluid chamber 33a of the C-3 damper 33 via the fluid passage e2. This C-3 damper 33 prevents pulsations in the apply pressure $P_{C3}$ that is supplied to and discharged from the hydraulic servo 43, and absorbs surge pressure (rapidly fluctuating pressure), and the like.

Next, when the control unit determines that the speed is to be forward fourth speed, forward fifth speed, or forward sixth speed, for example, it is determined that the clutch C-2 is to be applied so the linear solenoid valve SLC2 is controlled to regulate pressure, such that control pressure $P_{SLC2}$ is output from the linear solenoid valve SLC2. In this state, the control pressure $P_{SLC2}$ is output to the fluid chamber 21e of the first clutch apply relay valve 21 via the fluid passage c1, the second clutch apply relay valve 22, the fluid passage c2, the C-2 relay valve 23 (see FIG. 5), and the fluid passage c5. As a result, the control pressure $P_{SLC2}$ of the fluid chamber 21e which has a large diameter pressure-receiving area overcomes the urging force of the spring 21s and the first preparation pressure $P_{DC1}$ (i.e., the forward range pressure $P_D$) of the fluid chamber 21a which has a small diameter pressure-receiving area, such that the spool 21p of the first clutch apply relay valve 21 switches to the left side position. Therefore, the forward range pressure $P_D$ is output as the second preparation pressure $P_{DC2}$ from the output port 21d to the fluid passage j. However, as described above, in the second clutch apply relay valve 22 which is in the left side position by the urging force of the spring 22s, the input port 22g is cut off. Incidentally, the hydraulic pressure in the fluid passages k1 and k2 and the fluid chamber 21a (i.e., the first preparation pressure $P_{DC1}$) is drained because the output port 21b is communicated with the drain port EX.

Operation in Forward Fourth Speed

Next, when the control unit 70 determines that there is to be a shift from forward third speed to forward fourth speed, for example, the linear solenoid valve SLC1 is maintained in a pressure regulating state, the linear solenoid valve SLC3 is closed by being turned on, and the linear solenoid valve SLC2 is controlled to regulate pressure, while the solenoid valve S1 is turned on and the solenoid valve S2 is turned off, all according to electrical commands from the control unit 70.

That is, first, the clutch C-3 is released by regulating the pressure with the linear solenoid valve SLC3, i.e., the apply pressure $P_{C3}$ of the hydraulic servo 43 of the clutch C-3 (i.e., the control pressure $P_{SLC3}$) is discharged from the drain port EX of the linear solenoid valve SLC3 via the fluid passage e1, such that the clutch C-3 releases. Also, the linear solenoid valve SLC2 is changed from being on (i.e., energized), in which it is closed to make the control pressure $P_{SLC2}$ 0, to regulating the pressure. As described above, the apply pressure $P_{C2}$ output from the output port 23e of the C-2 relay valve 23 is input to the hydraulic servo 42 via the fluid passage c3, such that the clutch C-2 applies. As a result, forward fourth speed is established with the application of the clutch C-1.

Also, the check valve 52 and the orifice 62 are arranged in the fluid passage c2. Just as when the engine brake is applied in forward first speed described above, when supplying the apply pressure $P_{C2}$ to the hydraulic servo 42 of the clutch C-2, the check valve 52 closes so hydraulic pressure is moderately supplied via only the orifice 62. Also, when discharging the apply pressure $P_{C2}$ from the hydraulic servo 42, the check valve 52 is opened so the rate at which the hydraulic pressure discharges is much faster than the rate at which it is supplied. Further, the apply pressure $P_{C2}$ supplied to the fluid passage c2 is input to the fluid chamber 32a of the C2-B3 damper 32 via the fluid passage c4. This C2-B3 damper 32 prevents pulsations in the apply pressure $P_{C2}$ that is supplied to and discharged from the hydraulic servo 42, and absorbs surge pressure (rapidly fluctuating pressure), and the like.

Operation in Forward Fifth Speed

Next, when the control unit determines that there is to be a shift from forward fourth speed to forward fifth speed, for example, the linear solenoid valve SLC2 is maintained in a pressure regulating state, the linear solenoid valve SLC1 is closed by being turned off, and the linear solenoid valve SLC3 is controlled to regulate pressure, while similarly the solenoid valve S1 is turned on and the solenoid valve S2 is turned off, all according to electrical commands from the control unit 70.

That is, first, the clutch C-1 is released by regulating the pressure with the linear solenoid valve SLC1, i.e., the apply pressure $P_{C1}$ of the hydraulic servo 41 of the clutch C-1 (i.e., the control pressure $P_{SLC1}$) is discharged from the drain port EX of the linear solenoid valve SLC1 via the fluid passages b1 and b2 such that the clutch C-1 releases. Also, just as when shifting into forward third speed, the linear solenoid valve SLC3 is changed from being on (i.e., energized), in which it is closed to make the control pressure $P_{SLC3}$ 0, to regulating the pressure. This control pressure $P_{SLC3}$ is output as apply pressure $P_{C3}$ from the output port SLC3b, and input to the hydraulic servo 43 via the fluid passage e1, such that the clutch C-3 applies. As a result, forward fifth speed is established with the application of the clutch C-2.

Operation in Forward Sixth Speed

Then, when the control unit 70 determines that there is to be a shift from forward fifth speed to forward sixth speed, for example, the linear solenoid valve SLC2 is maintained in a pressure regulating state, the linear solenoid valve SLC3 is closed by being turned on, and the linear solenoid valve SLB1 is controlled to regulate pressure, while similarly the solenoid valve S1 is turned on and the solenoid valve S2 is turned off, all according to electrical commands from the control unit 70.

That is, first, the clutch C-3 is released by regulating the pressure with the linear solenoid valve SLC3, i.e., the apply pressure $P_{C3}$ of the hydraulic servo 43 of the clutch C-3 (i.e., the control pressure $P_{SLC3}$) is discharged from the drain port EX of the linear solenoid valve SLC3 via the fluid passage e1, such that the clutch C-3 releases. Also, just as when shifting into forward second speed, the linear solenoid valve SLB1 is changed from being turned off, in which it is closed to make the control pressure $P_{SLB1}$ 0, to being turned on (i.e., energized) so that it regulates the pressure. This control pressure $P_{SLB1}$ is output as apply pressure $P_{S1}$ from the output port SLC1b, and input to the hydraulic servo 44 via the fluid passage f1, such that the brake B-1 applies. As a result, forward sixth speed is established with the application of the clutch C-2.

Operation During a Shift from D to N

Then, when the driver shifts the shift lever from the D-range position into the N-range position after decelerating the vehicle and downshifting according to the vehicle speed, and bringing the vehicle to a stop in forward first speed, the forward range pressure output port of the manual shift valve is cut off from the input port, i.e., the forward range pressure $P_D$ is drained.

Also, simultaneously, when a shift lever sensor 84 detects that the shift lever is in the N-range position and the control unit 70 determines that the N-range has been selected based on the shift lever position, first, the linear solenoid valve SLC2 and the linear solenoid valve SLC3 are both turned on (i.e., energized) and the linear solenoid valve SLB1 is turned off, such that the control pressures $P_{SLC2}$, $P_{SLC3}$, and $P_{SLB1}$ are drained to 0 (i.e., a non-output state), i.e., the hydraulic pressure of the hydraulic servos 42, 43, 44, and 45 are drained, thereby releasing the clutch C-2, the clutch C-3, the brake B-1, and the brake B-2. Incidentally, the solenoid valve S1 is kept on (i.e., energized), and the solenoid valve S2 is kept off, i.e., the signal pressures $P_{S1}$ and $P_{S2}$ are not output from the solenoid valves S1 and S2, respectively.

Meanwhile, because release shock will occur if the clutch C-1 is suddenly released, for example, the linear solenoid valve SLC1 slowly releases the clutch C-1 by regulating the pressure so as to gradually reduce the control pressure $P_{SLC1}$ until it ultimately drains to 0 (i.e., a non-output state). Then when this clutch C-1 is released, the automatic transmission 3 is in neutral with all of the clutches and brakes released.

During release control by the linear solenoid valve SLC1, the accumulator 30, which is connected via the fluid passage a3 and the like to the input port SLC1a of the linear solenoid valve SLC1, releases the hydraulic pressure stored while in the D-range into the fluid passages a1 and a3 on the linear solenoid valve SLC1 side of the orifice 60, and maintains the hydraulic pressure. This makes gradual release control of the clutch C-1 by the linear solenoid valve SLC1 possible, thereby preventing release shock from occurring during a D to N shift operation from forward first speed.

Operation in Reverse First Speed

Also, when the driver shifts the shift lever into the R-range position, for example, the reverse range pressure $P_{REV}$ is output from the reverse range pressure output port of the manual shift valve, and the reverse range pressure $P_{REV}$ is input to the input port 24d of the B-2 relay valve 24 via the fluid passage 1 and the like, as described above.

Also, simultaneously, when the shift lever sensor 84 detects that the shift lever is in the R-range position and the control unit determines that the R-range has been selected based on the shift lever position, first, the solenoid valve S1 is kept on (i.e., energized) and the solenoid valve S2 is kept off, i.e., the signal pressure $P_{S2}$ is not output, so the B-2 relay valve 24 is kept in the left side position by the urging force of the spring 24s. As a result, the reverse range pressure $P_{REV}$ input to the input port 24d is supplied to the hydraulic servo 45 of the brake B-2 via the output port 24f and the fluid passage n, such that the brake B-2 applies.

Furthermore, the control unit 70 controls the linear solenoid valve SLC3 so that it regulates pressure to gradually output the control pressure $P_{SLC3}$. This control pressure $P_{SLC3}$ is output as apply pressure $P_{C3}$ from the output port SLC3b, and input to the hydraulic servo 43 via the fluid passage e1, i.e., the clutch C-3 is gradually applied. As a result, reverse first speed is established with the application of the brake B-2.

Incidentally, when the range is switched from the R-range to the N-range, the apply pressure $P_{B2}$ of the hydraulic servo 45 of the brake B-2 is drained via the fluid passage n, the B-2 relay valve 24, the fluid passage 1, and the manual shift valve, and the apply pressure $P_{C3}$ of the hydraulic servo 43 of the clutch C-3 is drained from the linear solenoid valve SLC3, just as when the N-range is selected as described above.

Also, when the driver shifts the shift lever into the R-range position and it is detected that the vehicle speed is equal to or greater than a predetermined speed in the forward direction, for example, the control unit turns on the solenoid valve S2 and keeps the linear solenoid valve SLC3 on (i.e., energized), i.e., the B-2 relay valve 24 prevents the R-range pressure $P_{REV}$ from being supplied to the hydraulic servo 45 of the brake B-2 and the apply pressure $P_{C3}$ (i.e., the control pressure $P_{SLC3}$) is not supplied to the hydraulic servo 43 of the clutch C-3. Thus, a so-called reverse-inhibit function that prevents reverse first speed from being established is provided.

Operation During a Solenoid all-Off Failure

Next, operation during a solenoid all-off failure in this hydraulic control apparatus 6 will be described. In the event of an all-off failure due to a control unit malfunction, short, or disconnection, or the like, the linear solenoid valve SLC1, the linear solenoid valve SLB1, and the solenoid valve S2 will not output hydraulic pressure because they are all normally closed types of solenoid valves, while the linear solenoid valve SLC2, the linear solenoid valve SLC3, and the solenoid valve S1 will output pressure because they are all normally open types of solenoid valves.

When traveling in forward first, second, or third speed during normal operation, the spool 21p of the first clutch apply relay valve 21 is locked in the right side position by the first preparation pressure $P_{DC1}$ input to the fluid chamber 21a as described above. Therefore, the first preparation pressure $P_{DC1}$ output from the output port 21b is input to the input port 22d of the second clutch apply relay valve 22 via the fluid passage k1 and cut off by the second clutch apply relay valve 22 that is in the left side position (i.e., the position during normal operation).

If an all-off failure occurs in this state, the second clutch apply relay valve 22 is switched to the right side position (i.e., the position during a failure) by the signal pressure $P_{S1}$ output from the solenoid valve S1 being input to the fluid chamber 22a via the fluid passage h3, and the first preparation pressure $P_{DC1}$ input to the input port 22d is output from the output port 22c, and input to the hydraulic servo 41 via the fluid passage b2, such that the clutch C-1 applies. Also, the control pressure $P_{SLC2}$ output from the linear solenoid valve SLC2 which is normally open is cutoff at the input port 22e of the second clutch apply relay valve 22 that has switched to the right side position. Meanwhile, in the linear solenoid valve SLC3 which is normally open, the line pressure $P_L$ input to the input port SLC3a is output substantially unchanged as apply pressure $P_{C3}$ from the output port SLC3b, and input to the hydraulic servo 43 via the fluid passage e1, such that the clutch C-3 applies. Therefore, even if the linear solenoid valve SLC2 which is normally open fails, hydraulic pressure will not be supplied to the clutch C-2, and the clutch C-1 and the clutch C-3 will apply, so forward third speed will be established (see FIG. 3). That is, if an all-off failure occurs while traveling in forward first, second, or third speed, a running state corresponding to forward third speed is ensured.

Also, when traveling in forward fourth, fifth, or sixth speed during normal operation, as described above, the control pressure $P_{SLC2}$ (i.e., the apply pressure $P_{C2}$) of the clutch C-2 is input to the fluid chamber 21e of the first clutch apply relay valve 21 via the fluid passage c1, the second clutch apply relay valve 22, the fluid passage c2, the C-2 relay valve 23, and the fluid passage c5, so the spool 21p is locked in the left side position. Therefore, the second preparation pressure $P_{DC2}$ output from the output port 21d is input via the fluid passage j to the input port 22g of the second clutch apply relay valve 22, where it is cut off because the second clutch apply relay valve 22 is in the left side position.

If an all-off failure occurs in this state, the second clutch apply relay valve 22 is switched to the right side position by the signal pressure $P_{S1}$ output from the solenoid valve S1 being input to the fluid chamber 22a via the fluid passage h3, and the second preparation pressure $P_{DC2}$ input to the input port 22g is output from the output port 22f, and input to the hydraulic servo 42 via the fluid passage c2, the C-2 relay valve 23 (see FIG. 4), and the fluid passage c3, such that the clutch C-2 applies. Also, the control pressure $P_{SLC2}$ (i.e., the apply pressure $P_{C2}$) output from the linear solenoid valve SLC2 which is normally open is cutoff at the input port 22e of the second clutch apply relay valve 22 that has switched to the right side position. However, the second preparation pressure $P_{DC2}$ output to the fluid passage c2 is also output to the fluid passage c5, and input to the fluid chamber 21e of the first clutch apply relay valve 21, so the first clutch apply relay valve 21 remains locked in the left side position. Then, in the linear solenoid valve SLC3 which is normally open, the line pressure $P_L$ input to the input port SLC3a is output substantially unchanged as apply pressure $P_{C3}$ from the output port SLC3b, and input to the hydraulic servo 43 via the fluid passage e1, such that the clutch C-3 applies. Therefore, the clutch C-2 and the clutch C-3 are applied so forward fifth speed is established (see FIG. 3). That is, in the event of an all-off failure while traveling in forward fourth, fifth, or sixth speed, a running state corresponding to forward fifth speed is ensured.

Also, if the vehicle is stopped and the shift lever is temporarily shifted into the N-range position when an all-off failure occurs while running normally in forward fourth, fifth, or sixth speed, the manual shift valve, not shown, stops outputting forward range pressure $P_D$ and instead drains the forward range pressure $P_D$. More particularly, the forward range pressure $P_D$ with respect to the linear solenoid valve SLC2 which is normally open and the input port 21c of the first clutch apply relay valve 21 is drained. When this is done, the second preparation pressure $P_{DC2}$ input to the fluid chamber 21e via the fluid passages j, c2, and c5 is drained, which releases the spool 21p that had been locked in the left side position by the second preparation hydraulic pressure $P_{DC2}$. As a result, the spool 21p is switched to the right side position by the urging force of the spring 21s. Incidentally, the signal pressure $P_{S1}$ continues to be output from the solenoid valve S1 which is normally open, so the second clutch apply relay valve 22 remains in the right side position by the signal pressure $P_{S1}$ that continues to be input to the fluid chamber 22a.

Incidentally, when the range is the N-range at the time an all-off failure occurs, the line pressure $P_L$ serves as the base pressure, and control pressure $P_{SLC3}$ (i.e., apply pressure $P_{C3}$) which is substantially the same pressure as the line pressure $P_L$ is output from the linear solenoid valve SLC3 that is normally open, so the clutch C-3 is applied. Also, even if the clutch C-3 is applied, the clutches C-1 and C-2, and the brakes B-1 and B-2 are released, so even if decelerated rotation is input to the sun gear S2, the sun gear S3 and the carrier CR2 rotate idly, such that a substantially neutral state is created between the input shaft 10 and the counter gear 11 (see FIG. 2).

If the driver then shifts the shift lever into the D-range position again, for example, forward range pressure $P_D$ is output from the manual shift valve. This forward range pressure $P_D$ is input to the input port 21c of the first clutch apply relay valve 21 that had been switched to the right side position, and output as first preparation pressure $P_{DC1}$ from the output port 21b to the fluid passage k1, and then input to the hydraulic servo 41 of the clutch C-1 via the input port 22d and the output port 22c of the second clutch apply relay valve 22 that is in the right side position, and the fluid passage b2, such that the clutch C-1 applies. That is, the state is the same as it is during an all-off failure when traveling in forward first, second, or third speed, so forward third speed is ensured. As a result, the vehicle is still able to take off again even after an all-off failure has occurred and the vehicle has stopped, so a limp-home function is ensured.

Structure of the Automatic Transmission Control Apparatus

Next, the control apparatus 1 of the automatic transmission according to the present invention will be described with reference mainly to FIG. 1.

Figure 1:
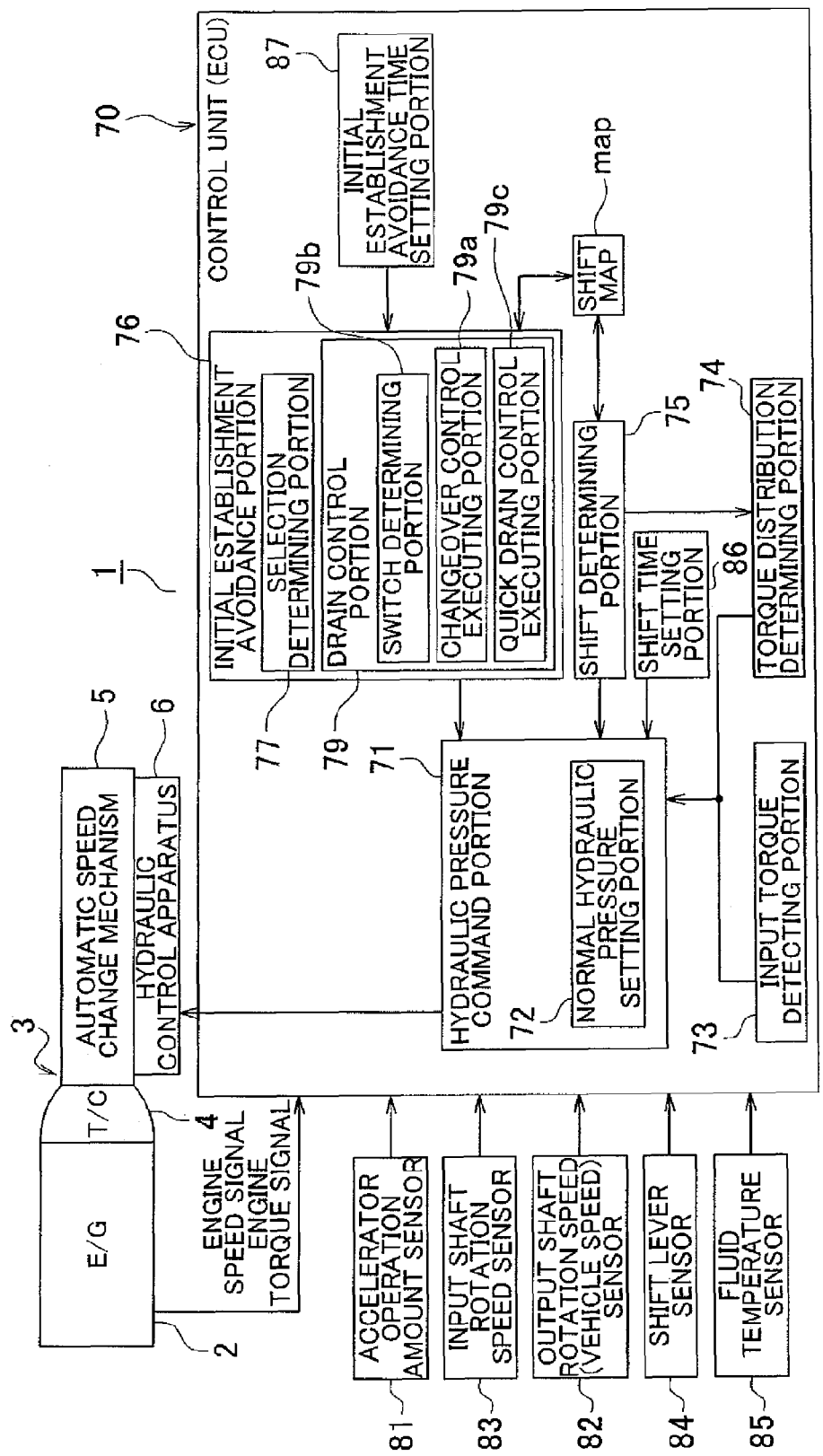
[FIG. 1]

As shown in FIG. 1, the control apparatus 1 of this automatic transmission includes the control unit (ECU) 70. This control unit 70 is connected to an accelerator operation amount sensor 81, an input shaft rotation speed sensor 83, an output shaft rotation speed (vehicle speed) sensor 82, a shift lever sensor 84 that outputs a range signal, and a fluid temperature sensor 85 that detects the temperature of the fluid in the automatic transmission 3, and the like. The control unit 70 is also connected to the linear solenoid valves SLC1, SLC2, SLC3, SLB1, S1, and S2 of the hydraulic control apparatus 6 described above, and the like. Also, an engine torque signal and an engine speed signal from an engine 2 are output to the control unit 70.

The control unit 70 includes a hydraulic pressure command portion 71 that has a normal hydraulic pressure setting portion 72, an input torque detecting portion 73, a torque distribution determining portion 74, a shift determining portion 75, and a shift map "map". The control unit 70 also includes an initial establishment avoidance portion 76. This initial establishment avoidance portion 76 includes a selection determining portion 77 and a drain control portion 79.

The shift determining portion 75 determines the speed from among the forward first speed to the forward sixth speed while referencing the shift map "map" based on the accelerator operation amount detected by the accelerator operation amount sensor 81 and the vehicle speed detected by the output shaft rotation speed sensor 82. That is, upshift lines and downshift lines (shift points) corresponding to the accelerator operation amount and the vehicle speed are stored in the shift map "map". The shift determining portion 75 determines that there is to be a shift when the accelerator operation amount and the vehicle speed at that time cross a shift line. The speed determined by the shift determining portion 75 (i.e., the current speed) is output to the hydraulic pressure command portion 71 and the torque distribution determining portion 74.

Meanwhile, the input torque determining device 73 measures the engine torque by receiving an engine torque signal from the engine 2, and detects the input torque that is currently being input to the input shaft 10 of the automatic speed change mechanism 5. Also, the torque distribution determining portion 74 determines (i.e., calculates) the distribution of torque which the clutches and brakes receive when being applied in the automatic speed change mechanism 5 (see FIG. 3) based on the speed determined by the shift determining portion 75, i.e., determines the required ratio of each of the clutch and brake with respect to the input torque based on each gear ratio.

Then, during normal operation, the normal hydraulic pressure setting portion 72 multiplies the torque which each of the clutch and brake receives when being applied, as determined by the torque distribution determining portion 74, by a safety factor according to the speed. Then the normal hydraulic pressure setting portion 72 multiplies the value of the product of the safety factor and the torque which each of the clutch and brake receives by the input torque detected by the input torque detecting portion 73 to calculate the torque capacity (transfer torque) of each of the clutches and brakes when being applied. Then the normal hydraulic pressure setting portion 72 calculates an apply pressure (i.e., control pressure) to be supplied to the hydraulic servos of the clutches and brakes that are applied, from the number and area of friction plates of each of the clutches and brakes, and the pressure-receiving area of the hydraulic servos, and the like.

Then, based on an apply pressure set by the normal hydraulic pressure setting portion 72, the hydraulic pressure command portion 71 outputs electrical commands to the linear solenoid valves SLC1, SLC2, SLC3, and SLB1 so that that apply pressure is supplied to the hydraulic servos of the clutches and brakes. That is, when traveling while the automatic transmission is in a normal condition, pressures supplied to the hydraulic servos of the clutches and brakes is controlled so that the torque capacity calculated with taking the safety factor into account is applied to each of the clutches and brakes. In particular, the clutches and brakes are applied so that they will not slip even if the engine torque of the engine 2 fluctuates or there is torque fluctuation from the driving wheels due to the road conditions or the like.

Take-Off Control of the Automatic Transmission in Extremely Cold Temperatures

Continuing on, shift control of the automatic transmission, or more particularly, take-off control in extremely cold temperatures, will be described in detail with reference to FIGS. 6 and 7. As shown in FIG. 7A, when the control unit 70 detects that the shift range has shifted from the N-range (i.e., a non-running range) to the D-range (i.e., a forward running range)

by a signal from the shift lever sensor 84, the shift determining portion 75 determines that an N to D shift has started.

Normally when it is determined that an N to D shift has started, the linear solenoid valve SLC1 outputs apply pressure $P_{C1}$ to the hydraulic servo 41 of the clutch C-1 to apply the clutch C-1, and the one-way clutch F-1 automatically applies at the optimal timing according to the increase in the engine (i.e., carrier CR2) speed, such that forward first speed is established.

At this time, transfer torque corresponding to the engine torque is applied to the one-way clutch F-1, and the transfer torque increases as the engine torque during take-off increases (see portion A in FIG. 7A). Also, when the engine torque becomes constant, the torque applied to the one-way clutch F-1 stabilizes and also becomes constant (see portion B in FIG. 7A).

Incidentally, shift control that establishes forward first speed (i.e., take-off speed) from the start of the N to D shift described above until the engine torque and the transfer torque applied to the one-way torque F-1 start to increase and finally become constant will be referred to as the initial establishment of forward first speed.

Figure 6:
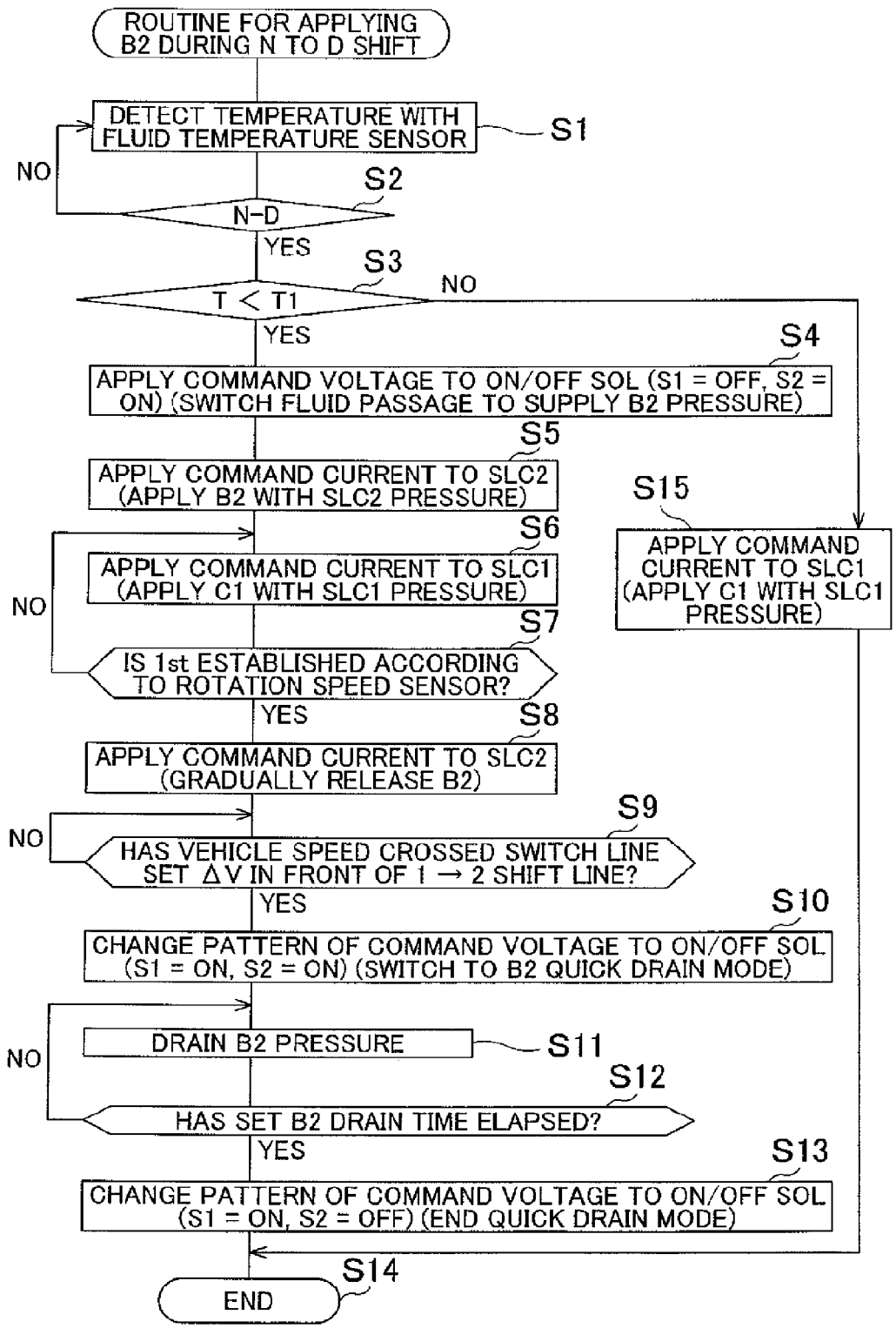
[FIG. 6]
Figure 7:
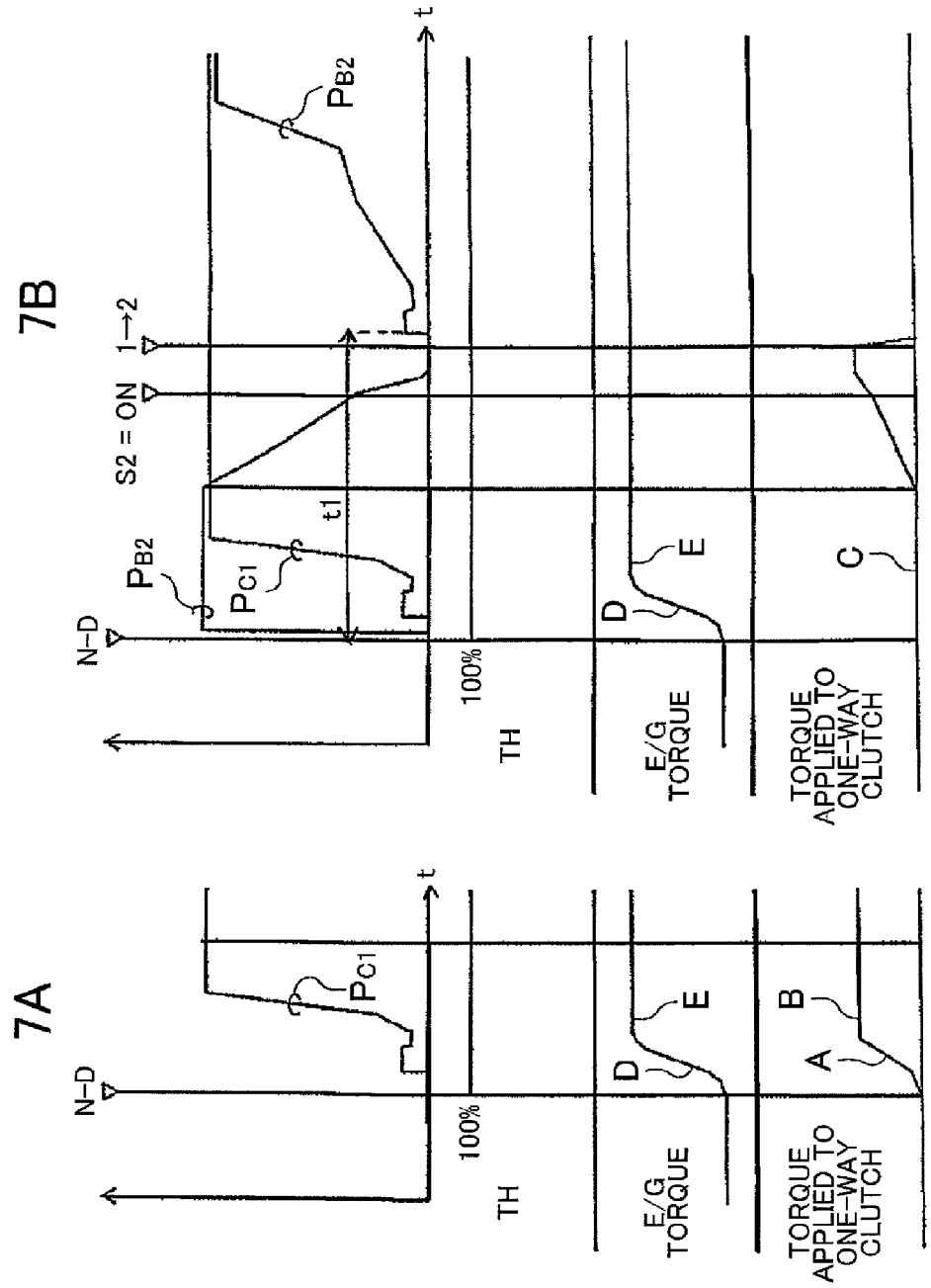
[FIG. 7]

Meanwhile, as shown in FIG. 6, the selection determining portion 77 detects the temperature of the hydraulic fluid of the automatic transmission based on the signal from the fluid temperature sensor 85 (S1). Then, when the selection determining portion 77 detects a shift from a non-running range to a running range by a signal from the shift lever sensor 84 (S2), the selection determining portion 77 determines whether to initially establish forward first speed (i.e., take-off speed), which is the lowest speed, using the one-way clutch F-1, based on whether the temperature T of the hydraulic fluid detected by the fluid temperature sensor 85 is lower than a temperature $T_1$ that is set in advance (i.e., whether $T<T_1$) (S3). Incidentally, because the temperature is low, the viscosity of the fluid in the one-way clutch F-1 is high so the oil film between the race and the roller is unable to be cut through. Therefore, the temperature $T_1$ is set to a temperature at which the one-way clutch F-1 may slip when torque is applied to it.

If the fluid temperature T is less than the set temperature $T_1$ (i.e., if $T<T_1$) and the selection determining portion 77 determines that initial application during take-off will not be performed using the one-way clutch F-1, the initial establishment avoidance portion 76 turns the solenoid valve S1 described above off and turns the solenoid valve S2 on to communicate the hydraulic circuits c1, c2, m, and n together. As a result, the fluid passage changes to a fluid passage that communicates the output port SLC2b of the linear solenoid valve SLC2 with the hydraulic servo 45 of the brake B-2 (S4).

When the fluid passage changes, the initial establishment avoidance portion 76 applies a command current to the linear solenoid valve SLC2 via the hydraulic pressure command portion 71 to output apply pressure $P_{B2}$ to the hydraulic servo 45 and apply the brake B2 (S5).

When the apply pressure $P_{B2}$ is output to the hydraulic servo 45 of the brake B-2 by the linear solenoid valve SLC2, the initial establishment avoidance portion 76 applies a command current to the linear solenoid valve SLC1 via the hydraulic pressure command portion 71 to output apply pressure $P_{B1}$ to the hydraulic servo 41 and apply the clutch C-1 (S6). Then, the initial establishment avoidance portion 76 determines whether forward first speed is established based on a signal from the input shaft rotation speed sensor 83 (S7).

As shown in FIG. 7B, when the initial application during take-off is performed using the brake B-2 instead of the one-way clutch F-1, such that forward first speed is established by the brake B-2 and the clutch C-1, the one-way clutch F-1 is held by the brake B-2 so almost no torque is applied to the one-way clutch F-1 (see portion C in FIG. 7B) even during the initial phase of take-off when the engine torque increases (portion D in FIG. 7B).

Also, when forward first speed is established, the drain control portion 79 applies a command current to the linear solenoid valve SLC2 by a changeover control executing portion 79a, such that the hydraulic pressure in the hydraulic servo 45 starts to gradually discharge from the drain port EX, thus gradually increasing the transfer torque applied to the one-way clutch (changeover control) (S8).

Figure 8:
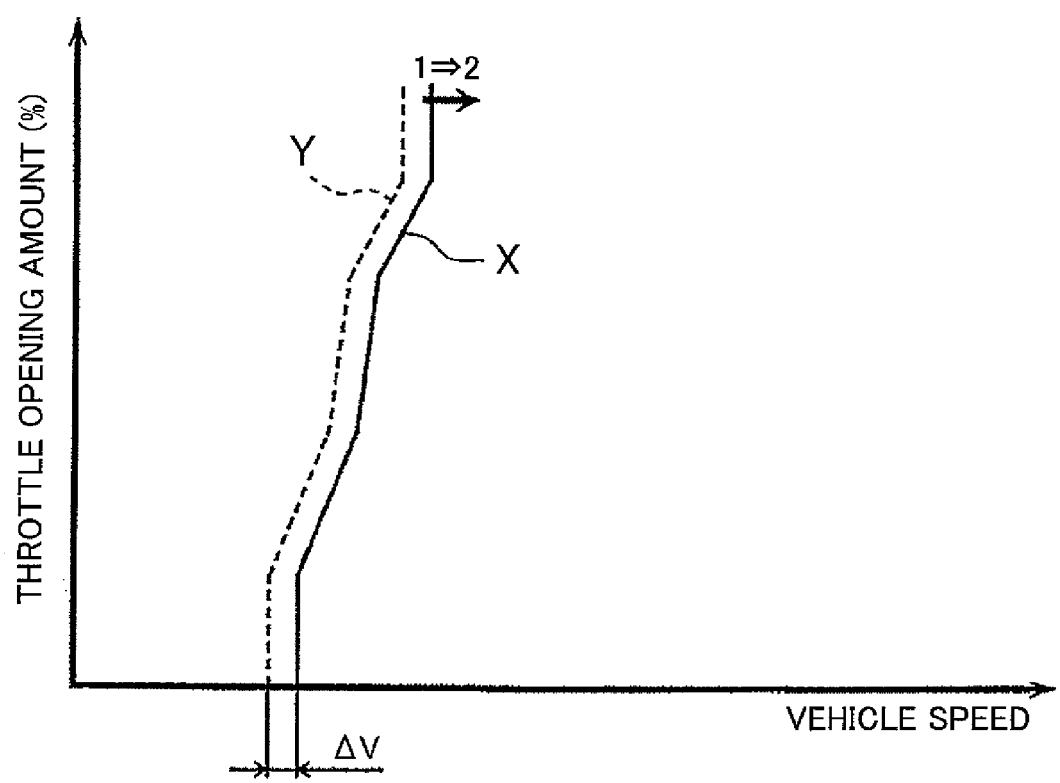
[FIG. 8]

As shown in FIG. 8, when a switch determining portion 79b determines that the vehicle speed has increased and crossed a switch line Y set farther toward the low vehicle speed side (i.e., a shift condition which is set father toward the low load side is met), by a predetermined value ΔV, than a shift line X from forward first speed to forward second speed on the shift map "map" (S9), a quick drain control executing portion 79c turns on both the solenoid valve S1 and the solenoid valve S2 via the hydraulic pressure command portion 71. As a result, control is switched from changeover control that discharges the hydraulic pressure in the hydraulic servo 45 of the clutch B-2 from the drain port EX of the solenoid valve SLC2, to quick drain control that discharges hydraulic pressure faster than the changeover control from the quick-drain drain port EXq of the C-2 relay valve 23 via the fluid passages n and m (S10).

Then, the hydraulic pressure in the hydraulic servo 45 is drained according to the quick drain control until a drain time $t_1$ set by an initial establishment avoidance time setting portion 87 has elapsed (S11 and S12). Once the drain time $t_1$ ends, the initial establishment avoidance portion 76 turns off the solenoid valve S2 and ends the quick drain control (S13 and S14).

Also, if the fluid temperature T is higher than the set temperature $T_1$ (i.e., if $T>T_1$) (S3), the selection determining portion 77 determines that forward first speed is to be initially established using the one-way clutch F-1, so forward first speed is established according to normal control in which the command current is applied to the linear solenoid valve SLC1 from the hydraulic pressure command portion 71 to apply the clutch C-1, and the one-way clutch F-1 is automatically applied.

Incidentally, the selection determining portion 77 may of course also determine whether the take-off speed should be initially established using the one-way clutch F-1 each time the selection determining portion 77 checks the temperature of the hydraulic fluid with the fluid temperature sensor 85. For example, the selection determining portion 77 may also detect the non-running state and the running state of the vehicle based on detection signals from the vehicle speed sensor, the brake sensor, and the accelerator operation amount sensor 81 and the like, and check the temperature of the hydraulic fluid with the fluid temperature sensor 85 each time the vehicle state shifts from a non-running state to a running state. The selection determining portion 77 may then perform the extreme low temperature take-off control described above if the fluid temperature T at that time is lower than the set temperature $T_1$ (i.e., if $T<T_1$).

More specifically, the selection determining portion 77 may detect that the vehicle has stopped because it is waiting for a traffic light or the like, and check the temperature T of the hydraulic fluid each time the vehicle starts to move again after being stopped (i.e., shifts from a non-running state to a running state). If the fluid temperature T is higher than the set fluid temperature $T_1$ (i.e., if $T>T_1$), the take-off speed (such as forward first speed) may be established using the one-way clutch F-1. If, on the other hand, the fluid temperature T is lower than the set fluid temperature $T_1$ (i.e., if $T<T_1$), the take-off speed may be initially established by applying the brake B-2.

Also, when the temperature of the hydraulic fluid is checked with the fluid temperature sensor 85 every time the vehicle switches from a non-running state to the running state, a detection timer may be provided, and the selection determining portion 77 may not perform the control to check the temperature of the hydraulic fluid described above after a sufficient amount of time for the hydraulic fluid to reach a set temperature or higher has passed after the range has been changed from a non-running range (such as the N-range) to a running range (such as the D-range), or, when the temperature T of the hydraulic fluid at the time the range is first changed from a non-running range to a running range after the engine is started is higher than the set fluid temperature $T_1$, the selection determining portion 77 may not check the fluid temperature until the engine has stopped the next time.

Moreover, the selection determining portion 77 may initially establish the take-off speed by always applying the brake B-2, without determining whether to use the one-way clutch F-1 or the brake B-2 to initially establish the take-off speed based on the fluid temperature, even if the vehicle is switched from a non-running state to a running state, within the detection time (i.e., before a sufficient amount of time for the hydraulic fluid to reach the set temperature or higher has passed), if the fluid temperature T is lower than the set temperature $T_1$ (i.e., $T<T_1$) when the range is changed from a non-running range (such as the N-range) to a running range (such as the D-range).

Also, the selection determining portion 77 may determine whether to use the one-way clutch F-1 or the brake B-2 to initially establish the take-off speed, based on the amount of change in the accelerator operation amount or the like instead of the fluid temperature, or based on a combination of the fluid temperature and the accelerator operation amount.

Furthermore, in addition to the set fluid temperature (i.e., a first set fluid temperature) $T_1$ described above, a second set fluid temperature $T_2$ that is a predetermined temperature higher than this set fluid temperature $T_1$ may be provided, and the selection determining portion 77 may initially establish the take-off speed by applying the brake B-2 when the temperature T of the hydraulic fluid is higher than the first set fluid temperature $T_1$ and lower than the second set fluid temperature $T_2$ (i.e., $T_1<T<T_2$) when the amount of change in the accelerator operation amount is large, i.e., when the vehicle takes off suddenly from a standstill, because a large amount of torque is applied to the one-way clutch F-1 at this time. Incidentally, the second set fluid temperature $T_2$ is set to a temperature at which the one-way clutch F-1 is unlikely to slip during a normal take-off but may slip during a sudden take-off.

Also, when the driver continues to drive the vehicle in such a manner that the vehicle speed does not cross the switch line Y, quick drain control may be forcefully ended when the shift time set by the shift time setting portion 86 ends.

Moreover, the quick drain control is switched from the B2 normal control when the switch line Y, which is set farther toward the low vehicle speed side, by a predetermined value ΔV, than the shift line X from the forward first speed to forward second speed, is crossed as described above. This switch line Y is set at a point that is after point E where the engine torque stops increasing (portion D in FIG. 7) and starts to stabilize, and at which a sufficient amount of time for the torque fluctuation of the engine to stabilize has passed.

Also, in this example embodiment, a case in which there is a shift from forward first speed to forward second speed is described as a first example, but this control may also be used during a skip shift from forward first speed to another speed such as forward third speed or the like.

Moreover, aside from the drain port EX of the linear solenoid valve SLC2 and the quick-drain drain port EXq of the C-2 relay valve 23, the hydraulic pressure in the hydraulic servo 45 of the brake B-2 may also be drained from a drain port of the manual shift valve via the fluid passage n, the B-2 relay valve 24, and the fluid passage 1. Also, the hydraulic pressure in the hydraulic servo 45 of the brake B-2 may be discharged appropriately by combining these drain methods which have different fluid drain rates.

Next, the operation of the automatic transmission according to this example embodiment will now be described. When the temperature T of the hydraulic fluid of the automatic transmission 3 is lower than the predetermined fluid temperature $T_1$ (i.e., $T<T_1$) and the selection determining portion 77 determines that forward first speed will not be initially established using the one-way clutch F-1, the initial establishment avoidance portion 76 turns both the solenoid valve S2 and the solenoid valve S1 on and controls the linear solenoid valve SLC2 to regulate the pressure, all via the hydraulic pressure command portion 71. When the solenoid valve S2 is turned on, the modulator pressure $P_{MOD}$ input to the input port S2a via the fluid passage g1 and g3 is output as signal pressure $P_{S2}$ from the output port S2b, and input to the fluid chamber 24a of the B-2 relay valve 24 via the fluid passage i, such that the spool 24p is forced downward in the drawing against the urging force of the spring 24s, and the B-2 relay valve 24 is placed in the right side position.

Also, when the solenoid valve S1 is turned off, the modulator pressure $P_{MOD}$ input to the input port S1a via the fluid passage g1 and g2 is output as signal pressure $P_{S1}$ from the output port S1b, and input to the input port 24c of the B-2 relay valve 24 via the fluid passage h1, as well as input to the fluid chamber 23a of the C-2 relay valve 23 via the fluid passage h2 from the output port 24b of the B-2 relay valve 24 which is in the right side position. As a result, the spool 23p of the C-2 relay valve 23 is forced downward in the drawing against the urging force of the spring 23s from the signal pressure $P_{S1}$ input to the fluid chamber 23a, such that the C-2 relay valve 23 is placed in the right side position.

Then when the linear solenoid valve SLC2 is controlled to regulate the pressure and the control pressure $P_{SLC2}$ is output from the output port SLC2b, this control pressure $P_{SLC2}$ is input via the fluid passage c1 to the input port 22e of the second clutch apply relay valve 22 which had been locked in the left side position, and output as apply pressure $P_{B2}$ to the fluid passage c2 from the output port 22f.

The apply pressure $P_{B2}$ output to the fluid passage c2 is input to the input port 23b of the C-2 relay valve 23 that is in the right side position, and output from the output port 23d. Furthermore, this apply pressure $P_{B2}$ is input via the fluid passage m to the input port 24e of the B-2 relay valve 24 which is in the right side position, and output from the output port 24f, after which it is input to the hydraulic servo 45 via the fluid passage n, such that the brake B-2 applies. As a result, forward first speed is established with the application of the clutch C-1 and the brake B-2.

Also, when the initial establishment avoidance portion 76 checks whether forward first speed is established based on the signal from the input shaft rotation speed sensor 83, the linear solenoid valve SLC2 is closed by being turned on (i.e., energized), and the control pressure $P_{SLC2}$ as the apply pressure $P_{B2}$ of the hydraulic servo 45 of the brake B-2 is drained from the drain port EX of the linear solenoid valve SLC2 (changeover control).

When the switch determining portion 79b determines that the vehicle speed has crossed the switch line Y, the solenoid valve S1 is closed by being turned on such that the C-2 relay valve is switched to the left side position. Therefore, the apply pressure $P_{B2}$ of the hydraulic servo 45 of the brake B-2 rapidly discharges from the quick-drain drain port EXq (i.e., the quick drain fluid passages n, 24f, 24e, m, 23d, and EXq) via the input port 24e and the fluid passage m, such that the brake B-2 quickly releases. Incidentally, the hydraulic pressure in the fluid passages c1 and c2 is discharged from the drain port EX of the linear solenoid valve SLC2.

When the apply pressure $P_{B2}$ of the hydraulic servo 45 of the brake B-2 is discharged and the drain time t1 of the brake B-2 passes, the solenoid valve S2 is turned off and the quick drain control ends.

Incidentally, the apply pressure $P_{B2}$ of the hydraulic servo 45 of the brake B-2 may also be discharged from the drain port of a manual valve, not shown, via the fluid passage 1 by turning the solenoid valve S2 off such that the B-2 relay valve 24 switches to the left side position.

Of these methods for discharging the apply pressure $P_{B2}$ in the hydraulic servo 45 of the brake B-2, discharging the apply pressure $P_{B2}$ from the quick-drain drain port EXq is the fastest. The next fastest hydraulic pressure discharge rate is achieved with the drain port of the manual valve, followed by the drain port EX of the linear solenoid valve SLC2, or conversely, with the drain port EX of the linear solenoid valve SLC2, followed by the drain port of the manual valve, depending on the rate at which hydraulic pressure is discharged from the discharge port EX of the linear solenoid valve SLC2, which varies.

The control apparatus 1 of the automatic transmission 3 as described above enables a speed to be reliably established and take-off achieved regardless of the conditions, by initially establishing forward first speed by applying the brake B-2, which is applied when coasting, instead of the one-way clutch F-1 when the temperature T of the hydraulic fluid of the automatic transmission 3 is lower than the predetermined temperature $T_1$ at which the one-way clutch F-1 may slip.

In particular, when initially establishing forward first speed in which a large amount of transfer torque is suddenly applied to the one-way clutch F-1, forward first speed is established by applying the brake B-2 and then applying the one-way clutch F-1 after the transfer torque applied to the one-way clutch F-1 has stabilized (after the torque load has decreased). Therefore, even when the fluid temperature is low (i.e., $T<T_1$), in which case the one-way clutch F-1 tends to slip, the one-way clutch F-1 can still be reliably applied. Also, it is also possible to shift into the next speed simply be re-applying the brake B-1 (an apply-side friction engagement element), for example.

Furthermore, even if an inexpensive one-way clutch is used, the one-way clutch will not slip so costs can be reduced while the structure of the automatic transmission can be made compact.

Also, the apply pressure $P_{B2}$ of the hydraulic servo of the brake B-2 can be discharged from three locations, i.e., the quick-drain drain port EXq of the C-2 relay valve 23, the drain port of the manual valve, and the drain port EX of the linear solenoid valve SLC2, which discharge hydraulic pressure at different rates. Therefore, the rate at which hydraulic pressure is discharged can be adjusted without having to provide a special new valve.

Moreover, when the vehicle speed has crossed the switch line Y, control is switched from changeover control that discharges the apply pressure $P_{B2}$ of the hydraulic servo of the brake B-2 from the drain port EX of the linear solenoid valve SLC2 to quick drain control that discharges the apply pressure $P_{B2}$ from the quick-drain drain port EXq of the C-2 relay valve 23. Therefore, the one-way clutch F-1 can be reliably applied without rapidly increasing the transfer torque of the one-way clutch F-1, and the brake B-2 is able to be reliably released before shifting to the next speed, thereby preventing the friction engagement elements from being simultaneously applied.

Incidentally, in the example embodiment described above, forward first speed is given as the take-off speed, but the present invention may also be applied with the take-off speed being another speed such as forward second speed or forward third speed or the like using the one-way clutch F-1. Also, an example in which the hydraulic control apparatus 6 of this automatic transmission is applied to the automatic transmission 3 that establishes six forward speeds and one reverse speed is described, but the present invention is of course not limited to this. For example, the hydraulic control apparatus 6 may also be applied to an automatic transmission that establishes eight forward speeds. In particular, the present invention may be applied to any type of automatic transmission as long as it performs stepped shifts.

[Industrial Applicability]

The automatic transmission according to the present invention may be used in a vehicle such as a passenger vehicle and a truck and the like, and is preferably used for an automatic transmission that establishes speeds using a one-way clutch. In particular, the automatic transmission according to the present invention is suited for an automatic transmission that uses a normal inexpensive one-way clutch, in which a smooth take off is required regardless of the conditions.

Accordingly, The automatic transmission according to the present invention may be used in a vehicle has a motor as drive unit.

The invention claimed is:

1. An automatic transmission characterized by comprising:
   an input shaft that is connected to a drive source;
   an output shaft that is connected to a driving wheel;
   a one-way clutch;
   a plurality of friction engagement elements which establish a plurality of speeds by changing a transmission path between the input shaft and the output shaft based on the application state of the plurality of friction engagement elements and application of the one-way clutch, one of the plurality of friction engagement elements being a brake that is applied when coasting in a take-off speed; and
   a controller which determines whether it is possible to initially establish the take-off speed using the one-way clutch based on a predetermined condition, and, if it is determined that it is not possible to initially establish the take-off speed using the one-way clutch, establishes the take-off speed by applying the brake, wherein after the take-off speed has been established by applying the brake, the controller executes changeover control to establish the take-off speed using the one-way clutch by gradually reducing the hydraulic pressure of a hydraulic servo of the brake, and after gradually reducing the pressure according to the changeover control the controller executes quick drain control which reduces the hydraulic pressure faster than the changeover control, and initially establishes the take-off speed using the brake.

2. The automatic transmission according to claim 1, wherein the controller determines whether to switch from the changeover control to the quick drain control based on a shift condition which is set farther toward the low load side, by a predetermined amount, than a shift condition which is used to determine a shift from the take-off speed to the next speed based on an accelerator operation amount and vehicle speed.

3. The automatic transmission according to claim 1, characterized by further comprising:
   a first friction engagement element which is included in the plurality of friction engagement elements and establishes the take-off speed by applying in conjunction with the brake;
   a plurality of apply pressure control solenoid valves, the number of which is at least one less than the number of the plurality of friction engagement elements, the plurality of apply pressure control solenoid valves supplying hydraulic pressure to the hydraulic servo of the brake and a hydraulic servo of the first friction engagement element;
   a distribution switching valve which is switched between a first position whereby hydraulic pressure from one of the apply pressure control solenoid valves is supplied to the hydraulic servo of the brake, and a second position whereby hydraulic pressure from one of the apply pressure control solenoid valves is supplied to the hydraulic servo of the first friction engagement element, the distribution switching valve having a drain port through which hydraulic pressure of the hydraulic servo of the brake is discharged when the distribution switching valve is switched from the first position to the second position; and
   a first signal solenoid valve which outputs a signal pressure that switches the distribution switching valve from the first position to the second position,
   wherein
   the controller, in the changeover control, controls the first signal solenoid valve to switch the distribution switching valve to be in the second position in order to discharge hydraulic pressure of the hydraulic servo of the brake via the drain port of the distribution switching valve.

4. The automatic transmission according to claim 3, characterized by further comprising:
   a forward-reverse switching valve which is interposed between the hydraulic servo of the brake and the distribution switching valve, and which has a first input port to which forward hydraulic pressure from the apply pressure control solenoid valve is supplied when a shift lever is in a position corresponding to a forward running range, a second input port to which reverse hydraulic pressure from a manual valve is supplied when the shift lever is in a position corresponding to a reverse running range, and an output port from which the forward hydraulic pressure or the reverse hydraulic pressure is supplied to the hydraulic servo of the brake, the forward-reverse switching valve being switched between a third position whereby the forward hydraulic pressure is supplied to the hydraulic servo of the brake, and a fourth position whereby the reverse hydraulic pressure is supplied to the hydraulic servo of the brake; and
   a second signal solenoid valve that outputs a signal pressure which switches the forward-reverse switching valve between the third position and the fourth position,
   wherein the forward-reverse switching valve is structured such that hydraulic pressure of the hydraulic servo of the brake is discharged from the drain port of the manual valve when the forward-reverse switching valve is switched from the third position to the fourth position when the shift lever is in the position corresponding to the forward running range.

5. The automatic transmission according to claim 1, wherein the controller determines whether a temperature of hydraulic fluid of the automatic transmission is lower than a predetermined temperature at which the one-way clutch may slip, as the predetermined condition; and the controller establishes the take-off speed by applying the brake when it is determined that the temperature of the hydraulic fluid of the automatic transmission is lower than the predetermined temperature.

6. The automatic transmission according to claim 5, wherein the controller initially establishes the take-off speed using the one-way clutch when it is determined that the temperature of the hydraulic fluid of the automatic transmission is equal to or greater than the predetermined temperature.

7. The automatic transmission according to claim 1, wherein the controller uses an amount of change in accelerator operation amount as the predetermined condition, and establishes the take-off speed by applying the brake when it is determined that the amount of change in the accelerator operation amount is greater than a predetermined amount of change.

8. An automatic transmission hydraulic control apparatus characterized by comprising:
   a plurality of friction engagement elements that establish a plurality of speeds by changing a transmission path between an input shaft and an output shaft based on the application state of the plurality of friction engagement elements;
   a plurality of apply pressure control solenoid valves, the number of which is at least one less than the number of the plurality of friction engagement elements, the plurality of apply pressure control solenoid valves being able to supply hydraulic pressure to hydraulic servos of the friction engagement elements;
   a distribution switching valve which is switched between a first position whereby hydraulic pressure from one of the apply pressure control solenoid valves is supplied to a hydraulic servo of a first friction engagement element, and a second position whereby hydraulic pressure from one of the apply pressure control solenoid valves is supplied to a hydraulic servo of a second friction engagement element, the distribution switching valve having a drain port through which hydraulic pressure of the hydraulic servo of the first friction engagement element is discharged when the distribution switching valve is switched from the first position to the second position; and
   a first signal solenoid valve which outputs a signal pressure that switches the distribution switching valve between the first position and the second position.

9. The automatic transmission hydraulic control apparatus according to claim 8, characterized by further comprising:
   a forward-reverse switching valve which is interposed between the hydraulic servo of the first friction engagement element and the distribution switching valve, and which has a first input port to which forward hydraulic pressure from the apply pressure control solenoid valve is supplied when a shift lever is in a position corresponding to a forward running range, a second input port to which reverse hydraulic pressure from a manual valve is supplied when the shift lever is in a position corresponding to a reverse running range, and an output port from which the forward hydraulic pressure or the reverse hydraulic pressure is supplied to the hydraulic servo of the first friction engagement element, the forward-reverse switching valve being switched between a third position whereby the forward hydraulic pressure is supplied to the hydraulic servo of the first friction engagement element, and a fourth position whereby the reverse hydraulic pressure is able to be supplied to the hydraulic servo of the first friction engagement element; and a second signal solenoid valve that outputs a signal pressure which switches the forward-reverse switching valve between the third position and the fourth position, wherein the forward-reverse switching valve is structured such that hydraulic pressure of the hydraulic servo of the first friction engagement element is discharged from the drain port of the manual valve when the forward-reverse switching valve is switched from the third position to the fourth position when the shift lever is in the position corresponding to the forward running range.

* * * * *